United States Patent
Fradkin et al.

(10) Patent No.: US 11,869,015 B1
(45) Date of Patent: Jan. 9, 2024

(54) COMPUTING TECHNOLOGIES FOR BENCHMARKING

(71) Applicant: Northern Trust Corporation, Chicago, IL (US)

(72) Inventors: Steven Fradkin, Glencoe, IL (US); Lucino Sotelo, Chicago, IL (US); Deepak Konale, Naperville, IL (US); Matt Moynihan, Schaumburg, IL (US); Margaret Shugrue, Arvada, CO (US); Purva Sule, Elmhurst, IL (US); Melissa Beardsley, Naperville, IL (US); Svyat Vergun, Chicago, IL (US); Dhruv Baronia, Buffalo Grove, IL (US); Rasheed Hameed, Chicago, IL (US); Vijay Luthra, Naperville, IL (US); Scott Gibbs, Aurora, IL (US); Peter Ferris, Wheaton, IL (US); Shaun Malott, Buffalo Grove, IL (US); Linda Flack, Chicago, IL (US); Larry Wang, Hawthorn Woods, IL (US)

(73) Assignee: Northern Trust Corporation, Chicago, IL (US)

(*) Notice: Subject to any disclaimer, the term of this patent is extended or adjusted under 35 U.S.C. 154(b) by 0 days.

(21) Appl. No.: 18/078,888

(22) Filed: Dec. 9, 2022

(51) Int. Cl.
*G06Q 30/01* (2023.01)
*G06Q 30/0601* (2023.01)
*G06Q 30/0204* (2023.01)

(52) U.S. Cl.
CPC ......... *G06Q 30/01* (2013.01); *G06Q 30/0204* (2013.01); *G06Q 30/0631* (2013.01)

(58) Field of Classification Search
CPC . G06Q 30/01; G06Q 30/0204; G06Q 30/0631
(Continued)

(56) References Cited

U.S. PATENT DOCUMENTS

| 8,838,688 B2 | 9/2014 | Lin |
| 9,047,376 B2 | 6/2015 | Wang |

(Continued)

FOREIGN PATENT DOCUMENTS

| CN | 101751448 B | 6/2012 |
| CN | 102841929 A | 12/2012 |

(Continued)

OTHER PUBLICATIONS

Eliciting Auxiliary Information for Cold Start User Recommendation: A Survey. Nor Aniza Abdullah; Rasheed Abubakar Rasheed; Mohd Hairul Nizam Md Nasir; Rahman, Md Mujibur. Applied Sciences11.20: 9608. MDPI AG. (2021).*

(Continued)

*Primary Examiner* — Timothy Padot
(74) *Attorney, Agent, or Firm* — Dentons US LLP

(57) ABSTRACT

Computing technologies for benchmarking, which may be based on a k-Nearest Neighbor (kNN) algorithm or another suitable machine learning algorithm, solve a cold start problem for a recommender engine employing a collaborative filtering algorithm when training data of user preferences or actual data of user actions is not available. For example, the cold start problem's unavailability of labeled data to train and develop a supervised model may be addressed by breaking the cold start problem down into two parts. The first part includes a KNN (or another suitable algorithm) model to cluster profiles based on a set of variables and this implementation of the KNN model is unsupervised, since there is no labeled data available to train the KNN model. The second part includes a prioritization algorithm that leverages certain outputs from the KNN model and neighbors to prioritize benchmarks. As such, using this two part approach, the cold start problem is solved (Continued)

by leveraging an unsupervised model to address lack of the labeled data.

18 Claims, 15 Drawing Sheets

(58) Field of Classification Search
USPC .......................................................... 705/7.29
See application file for complete search history.

(56) References Cited

U.S. PATENT DOCUMENTS

| | | | |
|---|---|---|---|
| 10,509,861 | B2 | 12/2019 | Rollins |
| 10,867,000 | B2 * | 12/2020 | Ahlstrom ................ G06F 9/453 |
| 10,878,029 | B2 | 12/2020 | Mitra |
| 11,151,472 | B2 | 10/2021 | Gopalan |
| 11,205,103 | B2 | 12/2021 | Zhang |
| 11,372,909 | B2 | 6/2022 | Sharma |
| 2009/0048884 | A1 * | 2/2009 | Olives .................... G06Q 40/00 705/40 |
| 2013/0346234 | A1 * | 12/2013 | Hendrick ........... G06Q 30/0631 705/26.7 |
| 2014/0040248 | A1 * | 2/2014 | Walsham ............ G06F 16/9535 707/723 |
| 2014/0358720 | A1 * | 12/2014 | Morales ............. G06Q 30/0631 705/26.7 |
| 2014/0372951 | A1 * | 12/2014 | Li ....................... G06F 16/5866 715/835 |
| 2015/0120722 | A1 | 4/2015 | Martín Martínez et al. |
| 2016/0147767 | A1 * | 5/2016 | Manning .............. G06F 3/0482 715/716 |
| 2018/0188415 | A1 * | 7/2018 | Imhof ................. G01V 99/005 |
| 2020/0073881 | A1 * | 3/2020 | Sharma .............. G06F 18/2411 |
| 2021/0357835 | A1 | 11/2021 | Modi |
| 2022/0059189 | A1 | 2/2022 | Rosing |
| 2022/0067551 | A1 | 3/2022 | Wei |
| 2022/0114186 | A1 | 4/2022 | Frazier |

FOREIGN PATENT DOCUMENTS

| | | | |
|---|---|---|---|
| CN | 102376063 | B | 9/2013 |
| CN | 103761237 | A | 4/2014 |
| CN | 105025091 | A | 11/2015 |
| CN | 103299651 | B | 8/2016 |
| CN | 106097204 | A | 11/2016 |
| CN | 106294758 | A | 1/2017 |
| CN | 106326367 | A | 1/2017 |
| CN | 106777051 | A | 5/2017 |
| CN | 106997358 | A | 8/2017 |
| CN | 107038609 | A | 8/2017 |
| CN | 107077545 | A | 8/2017 |
| CN | 107767238 | A | 3/2018 |
| CN | 107770365 | A | 3/2018 |
| CN | 108595525 | B | 9/2018 |
| CN | 108614860 | A | 10/2018 |
| CN | 108681548 | B | 10/2018 |
| CN | 109992674 | A | 7/2019 |
| CN | 110162601 | B | 8/2019 |
| CN | 110276387 | A | 9/2019 |
| CN | 110289073 | A | 9/2019 |
| CN | 110851705 | A | 2/2020 |
| CN | 111143681 | A | 5/2020 |
| CN | 111695023 | A | 9/2020 |
| CN | 109840833 | B | 11/2020 |
| CN | 111899063 | A | 11/2020 |
| CN | 111931061 | A | 11/2020 |
| CN | 111931062 | A | 11/2020 |
| CN | 112052392 | A | 12/2020 |
| CN | 110059257 | B | 2/2021 |
| CN | 112100385 | B | 2/2021 |
| CN | 112488863 | A | 3/2021 |
| CN | 109993668 | A | 7/2021 |
| CN | 113221003 | A | 8/2021 |
| CN | 108205682 | B | 10/2021 |
| CN | 108681977 | B | 5/2022 |
| CN | 113076481 | B | 5/2022 |
| CN | 115129929 | A | 9/2022 |
| CN | 110415084 | B | 10/2022 |
| CN | 115203264 | A | 10/2022 |
| JP | 6232066 | B2 | 11/2017 |
| KR | 20170024257 | B1 | 7/2017 |
| KR | 102383996 | B1 | 4/2022 |
| WO | WO2010009314 | A2 | 1/2010 |
| WO | WO2015040110 | A1 | 3/2015 |
| WO | WO2017178870 | A1 | 10/2017 |
| WO | WO2018126019 | A1 | 7/2018 |

OTHER PUBLICATIONS

Cold Start, Definition download from Wikipedia Dec. 8, 2022 (9 pages).
Recommender System, Definition download from Wikipedia Dec. 8, 2022 (23 pages).
International Search Report and Written Opinion dated Jun. 28, 2023 in a corresponding application PCT/US2022/052462 filed Dec. 9, 2022 (12 pages).

* cited by examiner

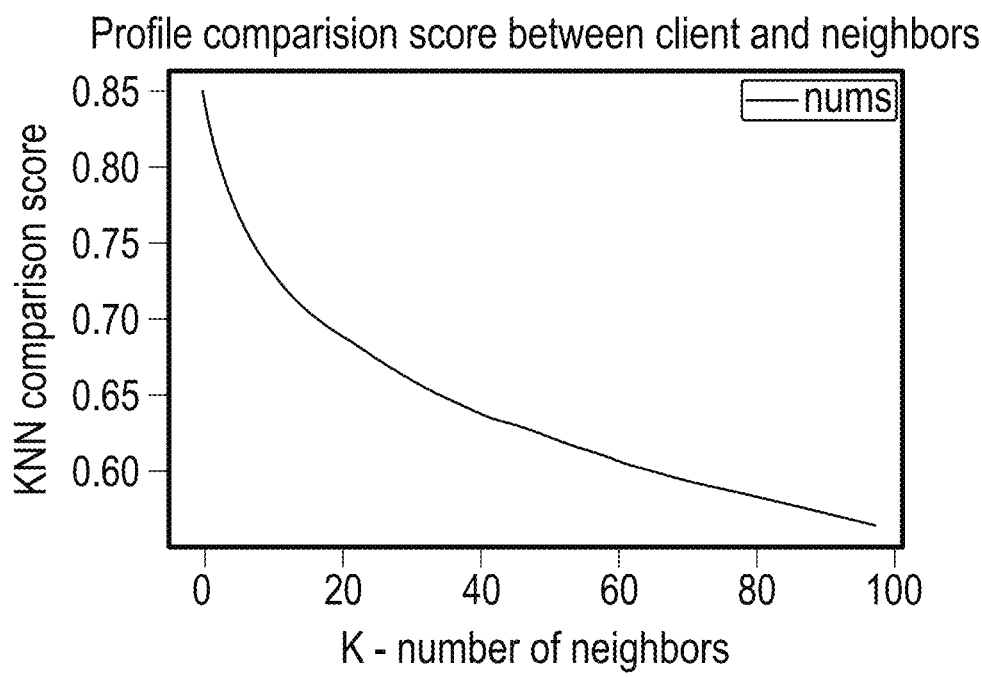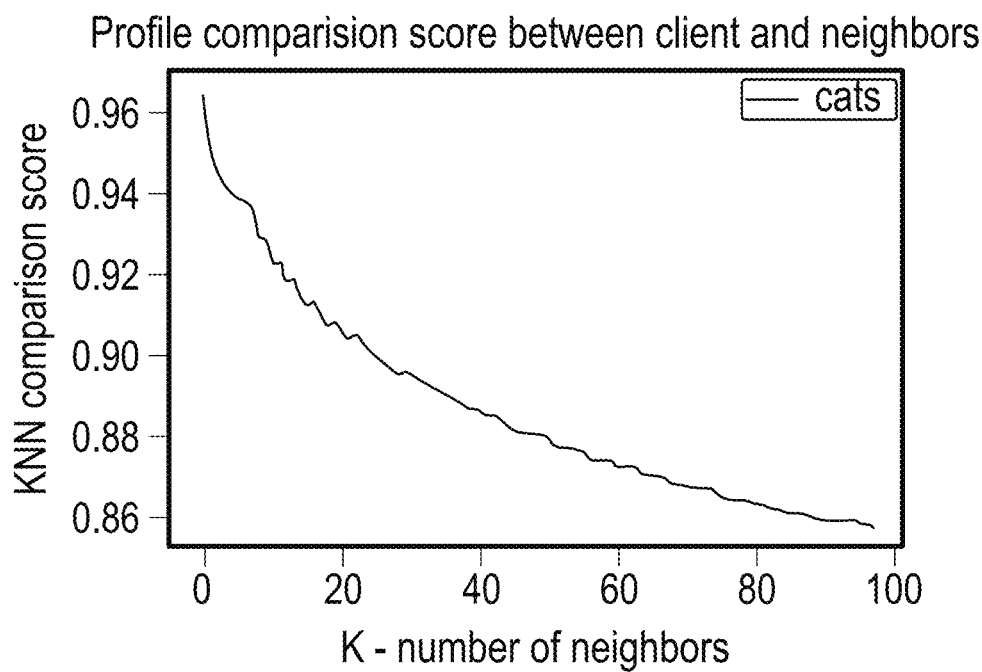
FIG. 6

Benchmarks for MVP (1/4)
Current Draft of MVP Benchmarks
Context to be Refined Legend: ▨ Confirmed for MVP  ▨ Not in MVP

| Advisory Moment | Parent Benchmarks | Context | Child Benchmarks |
|---|---|---|---|
| Investment / Asset Allocation | Liquid Concentration | Is there single stock concentration? What are the constraints, e.g., Board / company rules? Is a diversification conversation appropriate? Is there an opportunity to increase liquidity or GRATs or philanthropy? | Lines of credit Yes/No<br>Lines of credit $ Value<br>Lines of credit #<br>Philanthropic gifting Yes/No<br>Philanthropic gifting avg $ amt<br>GRAT - no metric<br>Single stocks concentration |
| | Alternative Assets Yes / No | Are they accredited investors who can invest in alternative assets? Do they have the risk appetite for alternative assets? | Alternative assets as a % of portfolio<br>Alternative assets $ value |
| | Average Lifestyle Spend $s | Has the client set a lifestyle spend target? | Lifestyle spend as a % of portfolio<br>Average lifestyle spend in quartiles |
| | Tax Advantage Equity | Does the client understand how to optimize after-tax returns? Do they expect to be in the highest tax bracket for the foreseeable future? Does the client have a portfolio with active tax optimization strategies (e.g., tax-loss harvesting)? | |
| | Years of Reserve #s | Does the client risk appetite align with their lifestyle spend? | Asset Sufficiency Yes/No |
| | Holds ESG / SRI Yes / No | Is the client interested in ESG issues? Opportunity to discuss investment strategies to support their interests | ESG/SRI as a % of assets<br>ESG/SRI $ value |

FIG. 7

Benchmarks for MVP (2/4)
Current Draft of MVP Benchmarks
Context to be Refined ☐ Confirmed for MVP  ▨ Not in MVP

| Advisory Moment | Parent Benchmark | Context | Child Benchmarks |
|---|---|---|---|
| Wealth Transfer | Asset sufficiency Yes/No | Does the client have excess assets where they would consider gifting their wealth? | ▨ Philanthropic gifting Yes/No<br>▨ Philanthropic gifting avg $ value<br>▨ Years of Reserve #<br>▨ Gifts to children<br>▨ GST - no metric<br>▨ Annual exclusion gift yes/no<br>▨ Holds Irrev Trust - no metric |
| | Annual exclusion gift plan Yes / No | Is the client focused enough on practicing estate planning? Does the trust include charitable giving? Opportunity to discuss wealth planning? | |
| | Financial Essentials | Is there an opportunity to educate young adult children of client on financial basics? | ▨ Financial Essentials yes/no<br>▨ Usage of lifetime exemption yes/no |
| | Philanthropic goal yes/no | Has the client set charitable goals? Are they interested doing so? | ▨ Philanthropic Goals $ value<br>▨ % to Alma Mater<br>▨ % by category |
| | Marital or Family Trust - no Metric | Has the client established a marital or family trust? | |
| | ILIT - no Metric | Does the client hold whole life insurance? If so, they should establish an ILIT to reduce tax burden. | |
| | GST - no Metric | Does the client hold a GST exempted Trust? If not, this can help reduce tax burden. | |

FIG. 8

Benchmarks for MVP (4/4)
Current Draft of MVP Benchmarks
Context to be Refined ☐ Confirmed for MVP  ▓ Not in MVP

| Advisory Moment | Parent Benchmarks | Context | Child Benchmarks |
|---|---|---|---|
| Managing Liquidity | ▓ Hold lines of credit Yes/No | Is client optimizing their liquidity profile? Opportunity to share benefits of a line of credit, regardless of the immediate need. Is the client under/over-leveraged? | ☐ % of liquid assets in IMAS<br>▓ Deposit account yes/no<br>▓ Debt to Asset ratio %<br>▓ Lines of credit # |
| | ▓ Holds NT Mortgage (s) Yes/No | Is there a goal for home purchase? Is there an opportunity to consider a mortgage for an existing or new home, or to discuss who mortgages are with, if not NT, as well as products and rates. | ▓ # of homes<br>☐ Held away mortgage(s) yes/no |
| | ▓ Aircraft and Boat Lending | Is there a goal for future purchases of yachts or aircraft? Is there an opportunity to help provide liquidity against any existing assets? | |
| Other Enablers | ▓ Deposit Accounts Yes/No | Would the client benefit from a deposit account, e.g., for each entity? | |
| | ▓ Private Passport Login Yes/No | Does the client use Private Passport? | |

| Total MVP Benchmarks | Parent # | Children # | Total # |
|---|---|---|---|
| ▓ | 21 | 33 | 54 |
| ▓ | 0 | 13 | 13 |

NTAC-3N5-20

FIG. 10

Advisory Moments
Show All
Filter By:

˅ Potentially Most Relevant Benchmarks

INVESTMENT/ASSET ALLOCATION
Alternative Assets 

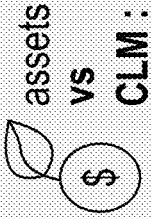 Client like CLM : 6 % of CLM hold alternative assets
vs
CLM : Yes Holds alternative assets Is the client an accredited investor? Do they have the risk and illiquidity appetite for alternatives? If they don't own alternative assets, has the client considered Alt assets previously and decided against them?

See More Details

ENABLERS
Private Passport 

 Client like CLM : 71 % of CLM enrolled in Private Passport
vs
CLM : Yes Has Private Passport Does the client use self-service tools at other companies? Would they like the freedom to have access to their assets (money movement, remote deposit, transaction status, statements, etc) at any time and place?

See More Details

FIG. 11

| Related Benchmarks | Questions to Consider | Topics for Discussion |
|---|---|---|
| For Has Line of Credit | | Opportunity to discuss if the client's cash managment needs are being met by NT or other institutions. If not with NT, opportunity to discuss why and what product is being used instead. Opportunity to share benefits of a line of credit, regardless of the immediate need. Is the client under/over-leveraged? Types of liquidity: Equity line of credit, IMAS line, business line, credit cards, other (tax advantages, cost of liquidity). Establishing a credit relationship in advance allows the client to be prepared for unexpected opportunities, while managing future tax implications of liquidating assets. Life events- Divorce, luxury purchase, Investment Opportunities, Tax Payments, Investment Capital Calls, Gifting |
| Allocation Investable Assets Ratio Clients like CLM: 61 % average ratio vs CLM: *N/A % ratio | Can we increase liquidity through Lines of Credit? | |
| Deposit Account Clients like CLM: 29 % of CLM with a deposit account vs CLM: Yes Has a deposit account | What features or capabilities are important to you for your day-to-day banking needs? For example, How do you do your banking? Online, mobile, zelle, remote deposits, ACH, Wires | |
| Numbers of Credit Lines Clients like CLM: 2 Average number of credit lines vs CLM: *N/A Number of credit lines | Is the client optimizing their liquidity profile? A line of credit does not have upfront costs and can be setup to customized based on client's cash flow and liquidity profile | |
| Illiquid Asset Ratio Clients like CLM: 79 Average Illiquid Asset Ratio vs CLM: *N/A Illiquid Asset Ratio | Given liquidity profile and concentration of illiquid assets would the client benefit from a line of credit to avoid selling assets? | |

Wealth Manageme... | Relationships | ∨ | Search...

☐ Bill Rodgers ∨ × ☐ Jack ∨ ×

Bill Rodger's key data is missing. Please update below to generate benchmarks

Wealth Source
Select an Option ▶

Personal Mailing State
Select an Option ▶

Marital Status
Select an Option ▶

Gender
Select an Option ▶

Submit

</br>

Attributes Considered ⓘ

| ⓘ Wealth Source | ☐ Total NT Assets | ✎ Marital Status | ▽ Age | ♤ Children | ☑ Mailing State | ✓ Used By |
|---|---|---|---|---|---|---|
| Business Owner/Entrepreneur | 6439572.26 | Married | 82 | false | TaxState | Business Owner/Entrepreneur |

See more details

COMPUTING TECHNOLOGIES FOR BENCHMARKING

TECHNICAL FIELD

This disclosure relates to computing technologies for benchmarking.

BACKGROUND

A recommender engine may generate a recommendation for a user. For example, the recommendation may include a link, a pointer, or a reference to an audio content, a video content, a social media user profile, a topic, a product listing, or other items of information. The recommender engine may generate the recommendation via a collaborative filtering algorithm, a content-based algorithm, or a hybrid of both. The collaborative filtering algorithm operates based on a model utilizing a set of historical reference data, whereas the content-based algorithm operates based on a model utilizing a set of pre-tagged reference characteristics.

The recommender engine employing the collaborative filtering algorithm uses the set of historical reference data for comparison against other sets of historical reference data to generate the recommendation based on similarity or dissimilarity therewith. However, the recommender engine requires the set of historical reference data to be voluminous for the recommendation to be sufficiently accurate. Therefore, the recommender engine employing the collaborative filtering algorithm may experience a potential cold start problem (e.g., a new community), because the recommender engine may not be able to draw any inferences or sufficiently accurate inferences for subject matter about which the recommender engine has not yet gathered sufficient reference information. Although some solutions to the cold start problem (e.g., a preference solicitation algorithm, a hybrid of the collaborative filtering algorithm and the content-based algorithm, a feature mapping algorithm) may be adequate in some use cases, this is not always feasible or practical. For example, if the recommender engine employing the collaborative filtering algorithm generates the recommendation for a product listing on an electronic commerce (e-commerce) platform, then such recommender engine may be operating based on training data of user preferences (e.g., likes or dislikes) or actual data of user actions (e.g., content consumption, product purchases). However, when such training data of user preferences or actual data of user actions is not available, then the cold start problem remains unsolved for the recommender engine employing the collaborative filtering algorithm. Additionally, the cold start problem becomes more technologically problematic if benchmarking based on the recommendation is desired.

SUMMARY

This disclosure solves various technological problems described above by enabling various computing technologies for benchmarking, which may be based on a k-Nearest Neighbor (kNN) algorithm or another suitable machine learning algorithm. These technologies solve the cold start problem for the recommender engine employing the collaborative filtering algorithm when training data of user preferences or actual data of user actions is not available, as further explained below. For example, the cold start problem's unavailability of labeled data to train and develop a supervised model may be addressed by breaking the cold start problem down into two parts. The first part includes a KNN (or another suitable algorithm) model to cluster profiles based on a set of variables and this implementation of the KNN model is unsupervised, since there is no labeled data available to train the KNN model. The second part includes a prioritization algorithm that leverages certain outputs from the KNN model and neighbors to prioritize benchmarks. As such, using this two part approach, the cold start problem is solved by leveraging an unsupervised model to address lack of the labeled data.

In an embodiment, there is a system comprising: a computing instance programmed to: access a set of profiles, wherein each profile in the set of profiles contains a profile identifier and a set of attributes, wherein each set of attributes in the sets of attributes includes a numerical attribute, a categorical attribute, and a Boolean attribute; identify a subset of profiles from the set of profiles for each respective profile in the set of profiles based on that subset of profiles being most similar to that respective profile according to a set of statistical distances measured and weighted using a statistical measure of entropy across the sets of attributes for the set of profiles based on the numerical attributes, the categorical attributes, and the Boolean attributes; associate the subsets of profiles respectively with the set of profile identifiers; present a user interface after the subsets of profiles are associated respectively with the set of profile identifiers, wherein the user interface is programmed to receive a user selection of a profile from the set of profiles; receive the user selection from the user interface; and in response to the user selection being received: identify a profile identifier for the profile based on the user selection; identify a subset of profiles associated with the profile identifier; access a set of quantitative benchmarks related with a set of content using the sets of attributes for the subset of profiles where each quantitative benchmark in the set of quantitative benchmarks is (i) a numeric value that summarizes on a specific content in the set of content among the subset of profiles and (ii) organized in a parent-child structure with each parent benchmark having associated child benchmarks mapped according to suitability for the profile; rank the set of quantitative benchmarks based on a degree of quantitative benchmark relevance among the subset of profiles associated with the profile identifier and a degree of profile deviation, wherein the degree of quantitative benchmark relevance measures how informative that respective quantitative benchmark is relative to other respective quantitative benchmarks for the profile, wherein the degree of profile deviation measures how different that respective quantitative benchmark is for the profile relative to those same respective quantitative benchmarks for the subset of profiles; and present the set of quantitative benchmarks as ranked and organized in the parent-child structure in the user interface.

In an embodiment, there is a method comprising: accessing, by a computing instance, a set of profiles, wherein each profile in the set of profiles contains a profile identifier and a set of attributes, wherein each set of attributes in the sets of attributes includes a numerical attribute, a categorical attribute, and a Boolean attribute; identifying, by the computing instance, a subset of profiles from the set of profiles for each respective profile in the set of profiles based on that subset of profiles being most similar to that respective profile according to a set of statistical distances measured and weighted using a statistical measure of entropy across the sets of attributes for the set of profiles based on the numerical attributes, the categorical attributes, and the Boolean attributes; associating, by the computing instance, the subsets of profiles respectively with the set of profile identifiers; presenting, by the computing instance, a user interface after the subsets of profiles are associated respectively with the set of profile identifiers, wherein the user interface is programmed to receive a user selection of a profile from the set of profiles; receiving, by the computing instance, the user selection from the user interface; and in response to the user selection being received by the computing instance: identifying, by the computing instance, a profile identifier for the profile based on the user selection; identifying, by the computing instance, a subset of profiles associated with the profile identifier; accessing, by the computing instance, a set of quantitative benchmarks related with a set of content using the sets of attributes for the subset of profiles where each quantitative benchmark in the set of quantitative benchmarks is (i) a numeric value that summarizes on a specific content in the set of content among the subset of profiles and (ii) organized in a parent-child structure with each parent benchmark having associated child benchmarks mapped according to suitability for the profile; ranking, by the computing instance, the set of quantitative benchmarks based on a degree of quantitative benchmark relevance among the subset of profiles associated with the profile identifier and a degree of profile deviation, wherein the degree of quantitative benchmark relevance measures how informative that respective quantitative benchmark is relative to other respective quantitative benchmarks for the profile, wherein the degree of profile deviation measures how different that respective quantitative benchmark is for the profile relative to those same respective quantitative benchmarks for the subset of profiles; and presenting, by the computing instance, the set of quantitative benchmarks as ranked and organized in the parent-child structure in the user interface.

DESCRIPTION OF DRAWINGS

FIG. 6 illustrates a comparison between two data sets one being larger than another for an embodiment according to this disclosure.

FIG. 7 to FIG. 10 illustrates a list of benchmarks for an embodiment according to this disclosure.

FIG. 11 illustrates an embodiment of a general screen for advisory moments according to this disclosure.

FIG. 12 illustrates an embodiment of a granular screen for advisory moments according to this disclosure.

FIG. 13 illustrates an embodiment of a screen for modifying a profile according to this disclosure.

DETAILED DESCRIPTION

Figure 1:
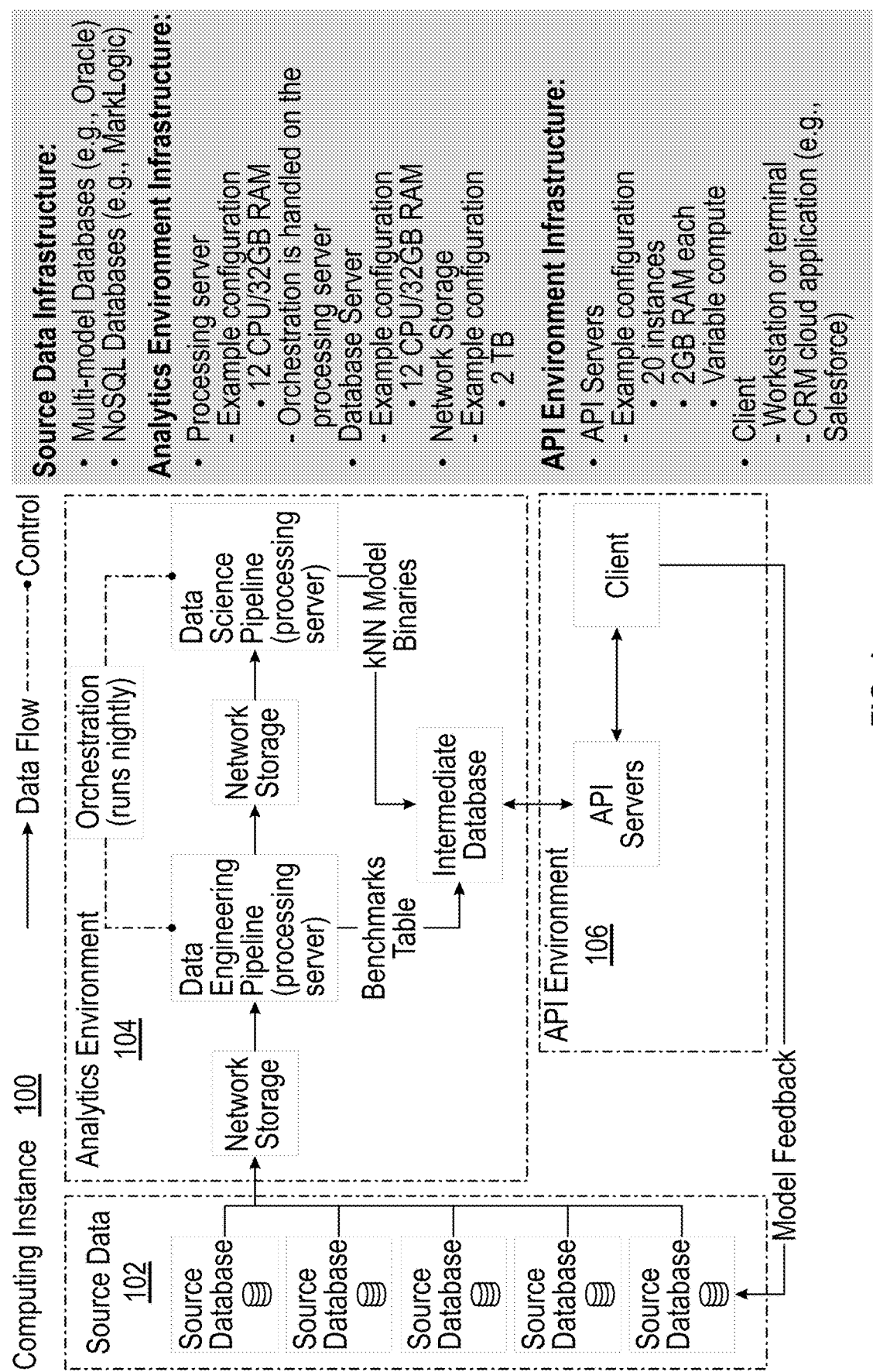
FIG. 1 shows a schematic diagram of an embodiment of a computing architecture for a system to benchmark according to this disclosure.

As explained above, this disclosure solves various technological problems described above by enabling various computing technologies for benchmarking, which may be based on a kNN algorithm or another suitable machine learning algorithm. These technologies solve the cold start problem for the recommender engine employing the collaborative filtering algorithm when training data of user preferences or actual data of user actions is not available, as further explained below. For example, the cold start problem's unavailability of labeled data to train and develop a supervised model may be addressed by breaking the cold start problem down into two parts. The first part includes a KNN (or another suitable algorithm) model to cluster profiles based on a set of variables and this implementation of the KNN model is unsupervised, since there is no labeled data available to train the KNN model. The second part includes a prioritization algorithm that leverages certain outputs from the KNN model and neighbors to prioritize benchmarks. As such, using this two part approach, the cold start problem is solved by leveraging an unsupervised model to address lack of the labeled data.

These technologies may be useful in various fields. For example, in context of advisory services (e.g., wealth management), there may be a computing instance that is programmed to enable a "Clients Like Me" (CLM) model (e.g., a recommender engine) designed to provide a relationship manager (RM) or a wealth strategist (WS) operating a workstation (e.g., a desktop computer, a laptop computer, a tablet computer, a smartphone) or a terminal (e.g., a desktop computer, a laptop computer, a tablet computer, a smartphone) with quantitative benchmarks (e.g., metrics) on wealth management (WM) topics to help the RM or the WS to better prepare for upcoming personal client conversations, while also ensuring more standardized, consistent, or uniform WM guidance among the RM or the WS across clients (e.g., user profiles), when training data of user preferences or actual data of user actions is not available. The recommender engine may be non-prescriptive and may enable augmentation of holistic advice for the RM.

The benchmarks generated from or based on the CLM model are based on historical information from a group of clients (e.g., a group of user profiles) that share similar attributes with a target client (e.g., a user profile) selected by the RM or the WS by operating the workstation or the terminal. The CLM model uses two steps to create the benchmarks. As the first step, a k-Nearest Neighbor (kNN) algorithm is used to identify 30 (or another number) clients (e.g., user profiles) that are most similar with the target client (e.g., a user profile), where the similarity is measured across 12 (or another number) attributes including demographics information, net worth level, and other financially relevant factors (attributes). As the second step, a total of 52 (or another number) benchmarks are determined (e.g., calculated) as summary statistics from the information of the 30 (or another number) most similar clients (e.g., user profiles) identified by the kNN algorithm. The benchmarks cover common WM advisory topics including asset allocation, account holding, investment choices which are identified and prioritized by WM practice leads, business subject matter experts (SMEs) and a panel of RMs and WS. Details of client attributes (e.g., user profiles) used as input and benchmarks as output are further explained below. Therefore, this embodiment enables the CLM model to be a descriptive model that helps the RM and the WS to better prepare for richer client conversations by providing quantitative statistics from the 30 (or another number) most similar clients (e.g., user profiles) as the target client (e.g., a user profile).

The CLM model may enable generation of the benchmarks which are then prioritized. For example, in context of wealth management, the CLM model may generate 52 (or another number) benchmarks for each user profile. These benchmarks are grouped together into parent and child benchmarks based on topics of discussion by RMs or WSs. For example, a Line of Credit discussion may also involves deposit accounts, number of lines of credit, debt to asset ratio, illiquidity, and other factors. The benchmarks for each user profile may be prioritized based on a rank ordering approach to allow users (e.g., RMs or WSs) to see more relevant benchmarks for the target profile at the beginning of the list. The rank approach for the benchmarks may be based on some of the following criteria. First, the ranking approach should distinguish between a Boolean (Yes/No) benchmark and continuous (for example, debt to asset ratio) benchmark. Second, the ranking approach should account for variability within neighbors. The ranking should rate benchmarks lower if the benchmarks have homogeneous distributions. A benchmark with more heterogeneous distribution among neighbors indicates that there have been more diverse options available for the profiles and worth more consideration compared with those less diverse. Third, the ranking approach should capture deviation between the target profile and its neighbors. A sufficient prioritization scheme will elevate those benchmarks which exhibit a notable deviation between the target profile's value and the neighbors' values. For example, if the target profile is currently not using line of credit (one attribute) and showing interest in using one (another attribute), and the benchmark shows 80% of similar user profiles are using lines of credit, this is a case worth considering and hence should be prioritized higher among all the benchmarks. As such, the approach for prioritization may be designed as follows. For a given Parent Boolean (Yes/No) benchmark output of a target profile, compute the score as percentage points of Yes neighbors. For a given Parent Continuous benchmark, compute the score as difference between target and neighbor average, followed by normalization with range of neighbor values. Normalization ensures that score remains between 0 and 100 and hence can be compared with Boolean benchmark scores. Prior to ranking on the aforementioned metric, some, many, most, or all benchmarks scores are first boosted by 100 on a threshold flag (0 or 1) based on flag being 0 if the benchmark is a benchmark of a certain type and the target has less than 10 benchmarks of that type (this is to ensure analytically robust benchmark values); otherwise flag is 1. Note that although this is discussed in context of wealth management, this technology is not limited to such field. Rather, the this technology can be applied to other fields, whether in advisory services, e-commerce, or other suitable fields.

The CLM model may be implemented in or via an executable logic (e.g., an application program, a dedicated analytics personalization layer) with an Application Program Interface (API) interacting with a network-based client relationship management (CRM) application program or running on a planning or goals powered (e.g., goal planning) application program accessed by the RM or the WS operating the workstation or the terminal. For example, the benchmarks generated by the CLM model may be serviced to users via a web-based interface of the CRM application program. As such, at least in context of advisory services, the cold start problem for the recommender engine employing the collaborative filtering algorithm when training data of user preferences or actual data of user actions is not available is solved by the CLM model generating the benchmarks when training data of user preferences (e.g., profile preferences) or actual data of user actions (e.g., profile actions) is not available and enabling those benchmarks to be determined as summary statistics from the information of the most similar clients identified by the kNN algorithm, as further explained below. For example, the cold start problem's unavailability of labeled data to train and develop a supervised model may be addressed by breaking the cold start problem down into two parts. The first part includes a KNN (or another suitable algorithm) model to cluster profiles based on a set of variables and this implementation of the KNN model is unsupervised, since there is no labeled data available to train the KNN model. The second part includes a prioritization algorithm that leverages certain outputs from the KNN model and neighbors to prioritize benchmarks. As such, using this two part approach, the cold start problem is solved by leveraging an unsupervised model to address lack of the labeled data.

This disclosure is now described more fully with reference to all attached figures, in which some embodiments of this disclosure are shown. This disclosure may, however, be embodied in many different forms and should not be construed as necessarily being limited to various embodiments disclosed herein. Rather, these embodiments are provided so that this disclosure is thorough and complete, and fully conveys various concepts of this disclosure to skilled artisans. Note that like numbers or similar numbering schemes can refer to like or similar elements throughout.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of the foregoing instances. For example, X includes A or B can mean X can include A, X can include B, and X can include A and B, unless specified otherwise or clear from context.

As used herein, each of singular terms "a," "an," and "the" is intended to include a plural form (e.g., two, three, four, five, six, seven, eight, nine, ten, tens, hundreds, thousands, millions) as well, including intermediate whole or decimal forms (e.g., 0.0, 0.00, 0.000), unless context clearly indicates otherwise. Likewise, each of singular terms "a," "an," and "the" shall mean "one or more," even though a phrase "one or more" may also be used herein.

As used herein, each of terms "comprises," "includes," or "comprising," "including" specify a presence of stated features, integers, steps, operations, elements, or components, but do not preclude a presence or addition of one or more other features, integers, steps, operations, elements, components, or groups thereof.

As used herein, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, terms, such as "then," "next," or other similar forms are not intended to limit an order of steps. Rather, these terms are simply used to guide a reader through this disclosure. Although process flow diagrams may describe some operations as a sequential process, many of those operations can be performed in parallel or concurrently. In addition, the order of operations may be rearranged.

As used herein, a term "response" or "responsive" are intended to include a machine-sourced action or inaction, such as an input (e.g., local, remote), or a user-sourced action or inaction, such as an input (e.g., via user input device).

As used herein, a term "about" or "substantially" refers to a +/−10% variation from a nominal value/term.

Although various terms, such as first, second, third, and so forth can be used herein to describe various elements, components, regions, layers, or sections, note that these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section, without departing from this disclosure.

Unless otherwise defined, all terms (including technical and scientific terms) used herein have a same meaning as commonly understood by skilled artisans to which this disclosure belongs. These terms, such as those defined in commonly used dictionaries, should be interpreted as having a meaning that is consistent with their meaning in context of relevant art and should not be interpreted in an idealized or overly formal sense, unless expressly so defined herein.

Features or functionality described with respect to certain embodiments may be combined and sub-combined in or with various other embodiments. Also, different aspects, components, or elements of embodiments, as disclosed herein, may be combined and sub-combined in a similar manner as well. Further, some embodiments, whether individually or collectively, may be components of a larger system, wherein other procedures may take precedence over or otherwise modify their application. Additionally, a number of steps may be required before, after, or concurrently with embodiments, as disclosed herein. Note that any or all methods or processes, as disclosed herein, can be at least partially performed via at least one entity or actor in any manner.

Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a schematic diagram of an embodiment of a computing architecture for a system to benchmark according to this disclosure. In particular, a computing instance 100 includes a source data logical unit 102, an analytics environment 104, and an application programming interface (API) environment 106. The analytics environment 104 signally communicates (e.g., sending data, receiving data) with the source data logical unit 102 and the API environment 106. The API environment 106 signally communicates (e.g., sending data, receiving data) with the source data logical unit 102 and the analytics environment 104.

The source data logical unit 102, the analytics environment 104, and the API environment 106 may be hosted in a single data center (e.g., for computational speed, network bandwidth, user privacy, administrative maintenance) or distributed among a set of data centers (e.g., for redundancy, user privacy). For example, at least two of the source data logical unit 102, the analytics environment 104, and the API environment 106 may be hosted in a single data center.

The source data logical unit 102 includes a set of source databases, each hosted on a database server. Each database in the set of source databases may be a multi-model database, a NoSQL database, an in-memory database, a relational database, a graphical database, or other suitable databases. Although the set of source database includes at least two databases, this is not required and the source data logical unit 102 can include a single database.

The analytics environment 104 includes a network storage (e.g., a network file system, a network drive), a data engineering pipeline (e.g., a server, a physical server, a virtual server, an application server), and an intermediate database (e.g., a multi-model database, a NoSQL database, an in-memory database, a relational database, a graphical database), where the data engineering pipeline signally communicates (e.g., sending data, receiving data) with the network storage and the intermediate database. The analytics environment 104 signally communicates with the source data logical unit 102 via the data engineering pipeline signally communicating (e.g., sending data, receiving data) with the set of source databases in the source data logical unit 102. The data engineering pipeline generates a benchmarks table and a set of kNN model binaries and requests those to be stored in the intermediate database, as further explained below.

The API environment 106 has a set of API (e.g., representational state transfer (REST) APIs, web APIs) servers (e.g., physical servers, virtual servers, web servers) and a client logic (e.g., a software client, a hardware client, a workstation, a terminal, a desktop computer, a laptop computer, a tablet computer, a smartphone, an application program, a dedicated application program, a browser application program, a productivity application program, an add-on, an extension, a module) signally communicating (e.g., sending data, receiving data) with the set of API servers. For example, the client logic can include an executable logic (e.g., an application program) running on a network-based CRM application program or a goal planning application program. The set of API servers signally communicates (e.g., sending data, receiving data) with the intermediate database. For example, the intermediate database may function as a backend to the set of API servers. The client logic signally communicates (e.g., sending data, receiving data) with the source data logical unit 102 to update data in the set of source databases in the source data logical unit 102.

In one mode of operation, in context of advisory services (e.g., wealth management), there may be a computing instance that is programmed to enable a CLM model (e.g., a recommender engine) designed to provide an RM or a WS with quantitative benchmarks (e.g., metrics) on WM topics to help the RM or the WS to better prepare for upcoming personal client conversations, while also ensuring more standardized, consistent, or uniform WM guidance among the RM or the WS across clients (e.g., user profiles) when training data of user preferences or actual data of user actions is not available, where the RM or WS operate the client logic interfacing with the set of API servers in the API environment 106.

The benchmarks generated from the CLM model are based on historical information from a group of clients (e.g., a group of user profiles) that share similar attributes with a target client (e.g., a user profile) selected by the RM or the WS), where the RM or WS operate the client logic interfacing with the set of API servers in the API environment 106. The CLM model uses two steps to create the benchmarks. As the first step, the data engineering pipeline in the analytics environment 104 interfaces with the network storage and the intermediate database to employ, run, or access a kNN algorithm to identify 30 (or another number) clients (e.g., user profiles) that are most similar with the target client (e.g., a user profile) based on data (e.g., user profiles with attributes) sourced from the set of source databases in the source data logical unit 102. The target client (e.g., user profile) is selected by the client logic interfacing with the set of API servers in the API environment 106. The similarity is measured across 12 (or another number) attributes including demographics information, net worth level, and other financially relevant factors. As the second step, the set of API servers in the API environment 106 determines (e.g., calculates) a total of 54 (or another number) benchmarks as summary statistics from the information of the 30 (or another number) most similar clients (e.g., user profiles) identified by the kNN algorithm. The benchmarks cover common WM advisory topics including asset allocation, account holding, investment choices which are identified and prioritized by WM practice leads, business SMEs, and a panel of RMs and WS. Details of client attributes (e.g., user profiles) used as input and benchmarks as output are further explained below. Therefore, this embodiment enables the CLM model to be a descriptive model that helps the RM and the WS to better prepare for richer client conversations by providing quantitative statistics from the 30 (or another number) most similar clients (e.g., user profiles) as the target client (e.g., a user profile). As such, at least in context of advisory services, the cold start problem for the recommender engine employing the collaborative filtering algorithm when training data of user preferences or actual data of user actions is not available is solved by the CLM model generating the benchmarks when training data of user preferences (e.g., profile preferences) or actual data of user actions (e.g., profile actions) is not available and enabling those benchmarks to be determined as summary statistics from the information of the most similar clients identified by the kNN algorithm, as further explained below. For example, the cold start problem's unavailability of labeled data to train and develop a supervised model may be addressed by breaking the cold start problem down into two parts. The first part includes a KNN (or another suitable algorithm) model to cluster profiles based on a set of variables and this implementation of the KNN model is unsupervised, since there is no labeled data available to train the KNN model. The second part includes a prioritization algorithm that leverages certain outputs from the KNN model and neighbors to prioritize benchmarks. As such, using this two part approach, the cold start problem is solved by leveraging an unsupervised model to address lack of the labeled data.

Figure 2:
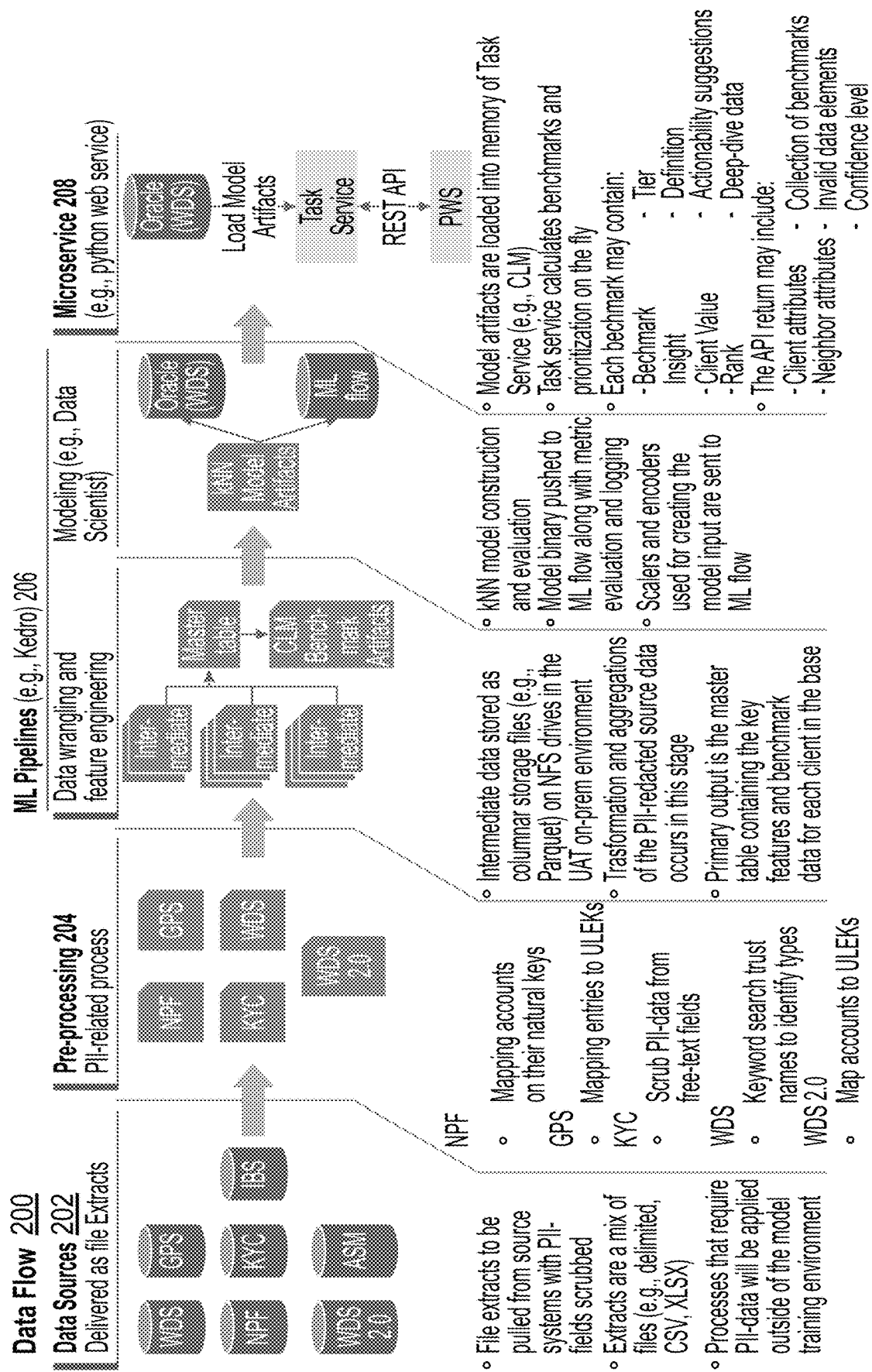
FIG. 2 shows a schematic diagram of an embodiment of a data flow to benchmark via the computing architecture of FIG. 1 according to this disclosure.

FIG. 2 shows a schematic diagram of an embodiment of a data flow to benchmark via the computing architecture of FIG. 1 according to this disclosure. In particular, a data flow 200 includes a set of steps 202-208 performed by the computing instance 100.

In data sourcing step 202, the data engineering pipeline in the analytics environment 104 signally communicates (e.g., sending data, receiving data) with the set of source databases in the source data logical unit 102 to receive file extracts, with certain fields within the file extracts being scrubbed to remove personally identifiable information (PII), as further explained below.

In pre-processing step 204, the data engineering pipeline in the analytics environment 104 performs various PII related processes to map entries of records from the set of source databases in the source data logical unit 102 among each other, as further explained below.

In machine learning (ML) steps 206, the data engineering pipeline in the analytics environment 104 involves data wrangling (e.g., transforming and mapping data from one raw data form into another format to make more suitable for downstream computing) and feature engineering, as further explained below. As such, a data structure (e.g., a table, an array, a JavaScript Object Notation (JSON) content) is formed, with the data structure containing a set of key features and benchmark data for each client (e.g., user profile) sourced from the records from the set of source databases in the source data logical unit 102. The data engineering pipeline in the analytics environment 104 reads the data structure to construct a kNN model therefrom. The KNN model and its artifacts may be stored in the intermediate database (e.g., using a star schema, a schema object) in the analytics environment 104 for being invoked by the set of API servers instructed by the client logic in the API environment 106.

In microservices step 208, the data engineering pipeline in the analytics environment 104 signally communicates (e.g., sending data, receiving data) with the API environment 106 to enable a microservices architecture on the set of API servers in the API environment 106 such that the microservices architecture interfaces with the intermediate database in the analytics environment 104 to determine (e.g., calculate) various benchmarks on-the-fly and rank (e.g., prioritize) those benchmarks on-the-fly, as mentioned above and further explained below. For example, each such benchmark may include a benchmark insight, a client value identifier, a rank identifier, a tier identifier, a definition, an actionability suggestion, and a user input element (e.g., a link, a button) to allow for a user (e.g., an RM, WS) to deep dive into that respective benchmark from the client logic interfacing with the set of API servers in the API environment 106. For example, the client logic interfacing with the set of API servers in the API environment 106 may request the set of API servers to serve the client logic with target client (e.g., user profile) attributes, neighbor user profile attributes, collection of benchmarks, invalid data elements (e.g., errors), confidence level, and other suitable data, as mentioned above and further explained below. Note that the microservices architecture may be programmed to have a dedicated microservice performing a dedicated discrete task, as disclosed herein. For example, there may be a dedicated microservice for generating the benchmarks, a dedicated microservice for ranking (e.g., prioritizing) the benchmarks, a dedicated microservice for presenting the benchmarks as ranked, or other dedicated microservice for computing tasks or actions disclosed herein.

In one mode of operation, in context of advisory services (e.g., wealth management), there may be a computing instance that is programmed to enable a CLM model (e.g., a recommender engine) designed to provide an RM or a WS with quantitative benchmarks (e.g., metrics) on WM topics to help the RM or the WS to better prepare for upcoming personal client conversations, while also ensuring more standardized, consistent, or uniform WM guidance among the RM or the WS across clients (e.g., user profiles) when training data of user preferences or actual data of user actions is not available, where the RM or WS operate the client logic interfacing with the set of API servers in the API environment 106. The benchmarks generated from the CLM model are based on historical information from a group of clients (e.g., a group of user profiles) that share similar attributes with a target client (e.g., a user profile) selected by the RM or the WS), where the RM or WS operate the client logic interfacing with the set of API servers in the API environment 106. The CLM model uses two steps to create the benchmarks. As the first step, in steps 202-206, the data engineering pipeline in the analytics environment 104 interfaces with the network storage and the intermediate database to employ, run, or access a kNN algorithm to identify 30 (or another number) clients (e.g., user profiles) that are most similar with the target client (e.g., a user profile) based on data (e.g., user profiles with attributes) sourced from the set of source databases in the source data logical unit 102. The target client (e.g., user profile) is selected by the client logic interfacing with the set of API servers in the API environment 106. The similarity is measured across 12 (or another number) attributes including demographics information, net worth level, and other financially relevant factors. As the second step, in step 208, the set of API servers in the API environment 106 determines (e.g., calculates) a total of 52 (or another number) benchmarks as summary statistics from the information of the 30 (or another number) most similar clients (e.g., user profiles) identified by the kNN algorithm. The benchmarks cover common WM advisory topics including asset allocation, account holding, investment choices which are identified and prioritized by WM practice leads, business Subject Matter Experts (SMEs), and a panel of RMs and WS. Details of client attributes (e.g., user profiles) used as input and benchmarks as output are further explained below. Therefore, this embodiment enables the CLM model to be a descriptive model that helps the RM and the WS to better prepare for richer client conversations by providing quantitative statistics from the 30 (or another number) most similar clients (e.g., user profiles) as the target client (e.g., a user profile). As such, at least in context of advisory services, the cold start problem for the recommender engine employing the collaborative filtering algorithm when training data of user preferences or actual data of user actions is not available is solved by the CLM model generating the benchmarks when training data of user preferences (e.g., profile preferences) or actual data of user actions (e.g., profile actions) is not available and enabling those benchmarks to be determined as summary statistics from the information of the most similar clients identified by the kNN algorithm, as further explained below. For example, the cold start problem's unavailability of labeled data to train and develop a supervised model may be addressed by breaking the cold start problem down into two parts. The first part includes a KNN (or another suitable algorithm) model to cluster profiles based on a set of variables and this implementation of the KNN model is unsupervised, since there is no labeled data available to train the KNN model. The second part includes a prioritization algorithm that leverages certain outputs from the KNN model and neighbors to prioritize benchmarks. As such, using this two part approach, the cold start problem is solved by leveraging an unsupervised model to address lack of the labeled data.

Figure 3:
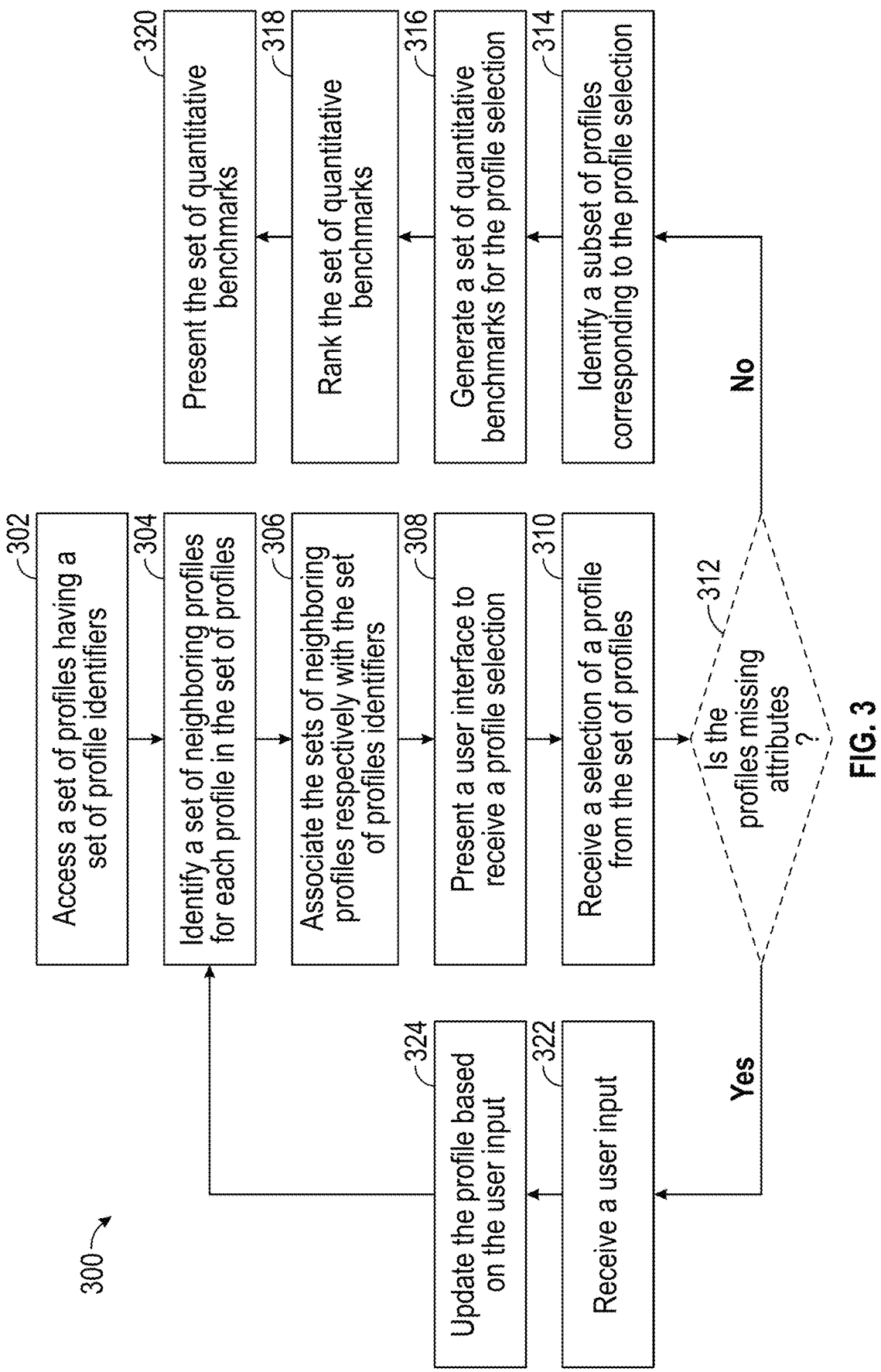
FIG. 3 shows a flowchart of an embodiment of a process to benchmark via the computing architecture of FIG. 1 and the data flow of FIG. 2 according to this disclosure.

FIG. 3 shows a flowchart of an embodiment of a process to benchmark via the computing architecture of FIG. 1 and the data flow of FIG. 2 according to this disclosure. In particular, a process 300 includes a set of blocks 302-314 performed by the computing instance 100 and the data flow 200. The computing instance 100 includes the analytics environment 104 and the API environment 106. The analytics environment 104 and the API environment 106 are separate and distinct from each other (e.g., logically, physically, electrically). The analytics environment 104 includes the data engineering pipeline and the intermediate database. The API environment 106 includes an API server(s) and a client logic, where the API server is in communication with the intermediate database and the client logic.

In block 302, the computing instance 100 accesses a set of profiles, where each profile in the set of profiles contains a profile identifier and a set of attributes and each set of attributes in the sets of attributes includes a numerical attribute(s), a categorical attribute(s), and a Boolean attribute(s), as further explained below. The profiles can be stored or sourced from the set of source databases in the source data logical unit 102. For example, the data engineering pipeline accesses the set of profiles based on interfacing with the set of source databases external to the analytics environment and the API environment, which may be positioned in the source data logical unit 102.

In block 304, the computing instance 100 identifies a subset of profiles from the set of profiles for each respective profile in the set of profiles based on that subset of profiles being most similar to that respective profile according to a set of statistical distances measured and weighted using a statistical measure of entropy across the sets of attributes for the set of profiles based on the numerical attributes, the categorical attributes, and the Boolean attributes, as further explained below. For example, the data engineering pipeline identifies the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes. For example, the analytics environment 104 may include a network storage storing the set of profiles, where the data engineering pipeline is in communication with the network storage to identify the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes. For example, the computing instance 100 (e.g., the analytics environment 104) may identify the subset of profiles from the set of profiles for the profile based on personally identified information being removed from the set of profiles or to generate the set of profiles.

The subset of profiles for each respective profile can be identified by employing a machine learning algorithm. The machine learning algorithm can be a non-parametric machine learning method. The non-parametric machine learning method can be a kNN algorithm using a weighted Euclidean distance as a measure of similarity of profiles across input attributes, to provide robust numeric properties across different distributions of input attributes, and also high interpretability given that all attributes remain in original form except for basic transformations (e.g., mean subtraction, standardization). The Euclidean distance used by kNN model incorporates cross-entropy weighting to account for the level of information content in each input attributes. The rationale is to allow more informative attributes (e.g., Total assets, age) to have higher importance (higher weight) than less informative attributes (e.g., Is Retired) to improve the similarity of neighbor profiles.

In block 306, the computing instance 100 associates the subsets of profiles respectively with the set of profile identifiers. This way each profile identifier is associated respectively with a subset of profiles (e.g., 30 profiles, 45 profiles). This association can be stored on the network drive, the data engineering pipeline, or the intermediate database. This association may be a list of profile identifiers (e.g., A, B, C, D) corresponding to the set of profiles (e.g., one-to-one correspondence) and a listing of profile identifier groups (e.g., BCD, ACD, ABD, ABC) corresponding to the subsets of profiles. The list of profile identifiers and the listing of profile identifier groups can be stored in a data structure (e.g., a file, a data file, a table, an array, a linked list, a JSON content). For example, the data engineering pipeline associates the subsets of profiles respectively with the set of profile identifiers in the intermediate database.

In block 308, the computing instance 100 presents a user interface, which may be after the subset of profiles is associated respectively with the set of profile identifiers. For example, the API server presents the user interface on the client logic. For example, the client logic runs on a network-based CRM application program or a goal planning application program. The user interface is programmed to receive a user selection of a profile from the set of profiles. The user selection can be made via a profile identifier (e.g., an alphabetic identifier, a numerical identifier) corresponding to the profile. For example, the user selection can be based on an entry of the profile identifier into a text box (e.g., typing), which may be aided by an autocomplete feature, a selection of a graphic or an icon corresponding to the profile identifier, a use of a dropdown menu to select a row corresponding to the profile identifier, or another suitable methodology. The user selection can be made by a physical or virtual keyboard, although a microphone may be used as well.

In block 310, the computing instance 100 receives the user selection from the user interface. For example, the API server presents the user interface on the client logic. For example, the client logic runs on a network-based CRM application program.

In block 312, the computing instance 100 performs a validation check to determine whether the profile selected by the user selection is missing a respective numerical attribute, a categorical attribute, or a Boolean attribute required for identifying the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes. If yes, then block 322 is performed. If no, then block 314 is performed.

In block 314, the computing instance 100 identifies a profile identifier for the profile based on the user selection and then identifies a subset of profiles associated with the profile identifier. The profile identifier may be identified by searching the set of profiles for the profile having the profile identifier matching the profile identifier selected by the user selection. The subset of profiles associated with the profile identifier is identified by accessing the data structure storing the list of profile identifiers corresponding to the set of profiles and the listing of profile identifier groups corresponding to the subsets of profiles, locating the profile identifier in the data structure, locating the profile identifier group for the profile identifier, reading each profile identifier in the profile identifier group, and accessing (e.g., retrieving, copying, loading) each profile corresponding each read profile identifier In block 316, the computing instance 100 accesses (or generates) a set of quantitative benchmarks related with a set of content (e.g., WM) using the sets of attributes for the subset of profiles where each quantitative benchmark in the set of quantitative benchmarks is (i) a numeric value that summarizes on a specific content in the set of content among the subset of profiles and (ii) organized in a parent-child structure (e.g., one-to-many correspondence) with each parent benchmark having associated child benchmarks mapped according to suitability for the profile, as further explained below. For example, the API server generates the set of quantitative benchmarks.

The subsets of profiles may be identified based on similarity measured across a group of attributes, where the set of quantitative benchmarks is numerically greater than the group of attributes. For example, the group of attributes may include 12 (or more or less) attributes (e.g., demographics, net worth level) whereas the set of quantitative benchmarks may be 54 (or more or less). For example, the group of attributes may be numerically less than the set of quantitative benchmarks.

In block 318, the computing instance 100 ranks the set of quantitative benchmarks based on a degree of quantitative benchmark relevance and a degree of profile deviation. For example, the API server ranks the set of quantitative benchmarks. The degree of quantitative benchmark relevance measures how informative that respective quantitative benchmark is relative to other respective quantitative benchmarks for the profile. The degree of profile deviation measures how different that respective quantitative benchmark is for the profile relative to those same respective quantitative benchmarks for the subset of profiles, as further explained below.

In block 320, the computing instance 100 present the set of quantitative benchmarks as ranked and organized in the parent-child structure in the user interface, as further explained below. For example, the API server presents the user interface on the client logic. For example, the client logic runs on a network-based CRM application program or a goal planning application program. For example, the user interface may present a set of tiles corresponding to the set of quantitative benchmarks, where each tile in the set of tiles is expandable to present or leads to a screen presenting a set of detailed information for that respective quantitative benchmark.

In block 322, the computing instance 100 presents the user interface when the user selection of the profile corresponds to the profile that is missing a respective numerical attribute, a categorical attribute, or a Boolean attribute required for identifying the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes. The user interface, whether same or different screen as blocks 308-310, is programmed to receive a user input for the respective numerical attribute, the categorical attribute, or the Boolean attribute that is missing from the profile. For example, the API server presents the user interface on the client logic. The user input can be made via an attribute identifier (e.g., an alphabetic identifier, a numerical identifier, a Boolean identifier) corresponding to the profile. For example, the user input can be based on an entry of the attribute identifier into a text box (e.g., typing), which may be aided by an autocomplete feature, a selection of a graphic or an icon corresponding to the attribute identifier, a use of a dropdown menu to select a row corresponding to the attribute identifier, or another suitable methodology. The user input can be made by a physical or virtual keyboard, although a microphone may be used as well. As such, the user interface may receive the user input, as further explained below. If the user interface is a tabbed interface having a tab to enter the user input for the respective numerical attribute, the categorical attribute, or the Boolean attribute that is missing from the profile, as explained above, then the set of quantitative benchmarks may be presented not in the tab but in another tab.

In block 324, the computing instance 100 updates the profile based on the user input such that the respective numerical attribute, the categorical attribute, or the Boolean attribute that was previously missing and required for identifying the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes is no longer missing, as further explained below. Then, the block 304 can be performed.

In one mode of operation, the computing instance 100, as disclosed herein, enables the CLM model is designed to provide RMs and WSs with quantitative benchmarks on WM topics to help them better prepare for upcoming client conversations. The benchmarks generated from the model are based on historical information from a group of clients (e.g., profiles) that share similar attributes with a target client (e.g., a user selected profile). The CLM model uses two steps to create benchmarks. As the first step, a kNN algorithm is used to identify 30 (or another number of desired profiles) clients that are most similar with the target client (e.g., a user selected profile), where the similarity is measured across 12 (or another number) attributes including demographics information, net worth level, and other financially relevant factors. As the second step, a total of 54 (or another number) benchmarks are determined (e.g., calculated) as summary statistics from the information of the 30 (or another number of desired profiles) most similar clients identified by the kNN algorithm. The benchmarks cover common WM advisory topics including asset allocation, account holding, investment choices which pre-identified and pre-prioritized. Therefore, the CLM model is a descriptive model that helps users to better preparing for client conversations by providing quantitative statistics from the 30 (or another number of desired profiles) most similar clients as the target client (e.g., a user selected profile). The CLM model may or may not provide recommendations or decisions that could affect any client, and may or may not help users to have richer client conversations. The CLM model may be implemented on the network-based CRM application program or a goal planning application program.

The CLM model may use weighted Euclidean distance as a measure of similarity of clients across input attributes, to provide robust numeric properties across different distributions of input attributes, and also high interpretability given that all attributes remains in original form except for basic transformations (e.g., mean subtraction, standardization). The Euclidean distance used by kNN model incorporates cross-entropy weighting to account for the level of information content in each input attributes. The rationale is to allow more informative attributes (e.g., Total assets, age) to have higher importance (higher weight) than less informative attributes (e.g., Is Retired) to improve the similarity of neighbors.

For the input attributes where data not captured for all profile, the missing information is treated as not applicable for a profile (e.g., Boolean variable value set to False). The rationale is that by setting missing information to non-applicable category allows the kNN model to identify neighbors using information from other attributes and less affected by the missing value.

The number of similar profiles (parameter k of kNN) used to create benchmarks is 30 (although more or less is possible), which may be derived based on the analysis for optimal balance between the similarity of clients with neighbors (favors smaller k) and the coverage of Goals Powered Solutions (GPS) clients in the neighbors to support benchmarks that requires GPS data elements (favors larger k). For example, there may be 10, 15, 20, 25, 35, 40, 45, 55, or more similar profiles, including intermediate whole values (e.g., 11, 13, 17, 22).

Across all benchmarks that the CLM model can generate, a prioritization algorithm may be implemented to rank benchmarks based on the relevance (how informative the benchmark is or behavior of similar user profiles) and client deviation (how different the client value is from the benchmark value of similar clients). The assumption is that the benchmark should be prioritized if that benchmark shows high relevance (more heterogeneous or homogeneous values among neighbors), as well as high deviation of client values with neighbors (through a composite score of diversity and deviation).

The CLM model generally requires clients to have data available for major input attributes used to identify similar profiles, including source of wealth, total assets, marital status and age, location. If a client (e.g., a profile) is missing any of the above information, then that data may be currently out of scope of the model due to the fact that identifying similar profiles with missing values in key attributes will be less accurate and hence resulted in less accurate benchmarks.

Profiles with missing information are included in the modeling base (e.g., having children, having young children, having adult children). The CLM model may use default values to identify neighbors assuming the client profile is not applicable for that attribute.

The CLM model is designed to provide RMs and WSs with quantitative benchmarks on wealth management topics to help them better prepare for upcoming client conversations. The benchmarks generated from the CLM model is based on historical information from a subset of clients that share similar attributes with the target client. The CLM model is a descriptive model that allow RMs to better understand current clients (e.g., profiles) who are similar to a target client (e.g., a user selected profile). The CLM model may or may not provide any recommendations or decisions that could affect the target client or help users to have richer client conversations with clients.

Figure 4:
FIG. 4 shows a diagram of an embodiment of a process to benchmark via the computing architecture of FIG. 1, the data flow of FIG. 2, and the process of FIG. 3 according to this disclosure

FIG. 4 illustrates an example overview of the two major steps in the CLM model using example target client (Ann) on four input attributes. The model generates example output of benchmark that 50% of clients like Ann (with similar Total NT Asset, Age, Marital Status and Source of Wealth) are using line of credit or alternative assets. This information can help RMs to have data backed information on usage of line of credit or alternative asset classes, such as PE funds and hedge funds among similar clients when preparing conversations related with using credit or investment allocation.

The kNN may identify the neighboring profile based on a set of attributes. For example, there may be 12 client attributes used by the kNN model to identify most similar clients: source of wealth, total assets, marital status, age, source of wealth, cost center code, whether the client has child(ren), whether the client has adult child(ren), whether the client has young child(ren), client is specific type of user, is retired, and location. Therefore, the profile is selected if all of source of wealth, total net worth asset, marital states, location group and age are available (these attributes are identified as most relevant for identifying similar profiles regarding WM). Client missing any of the above attributes is excluded from the set of profile for identifying the neighboring profiles and not used for model building. Missing values of the remaining attributes are allowed as the information are supplementary regarding WM and the CLM model uses default values for missing information in the remaining variables.

Figure 5:
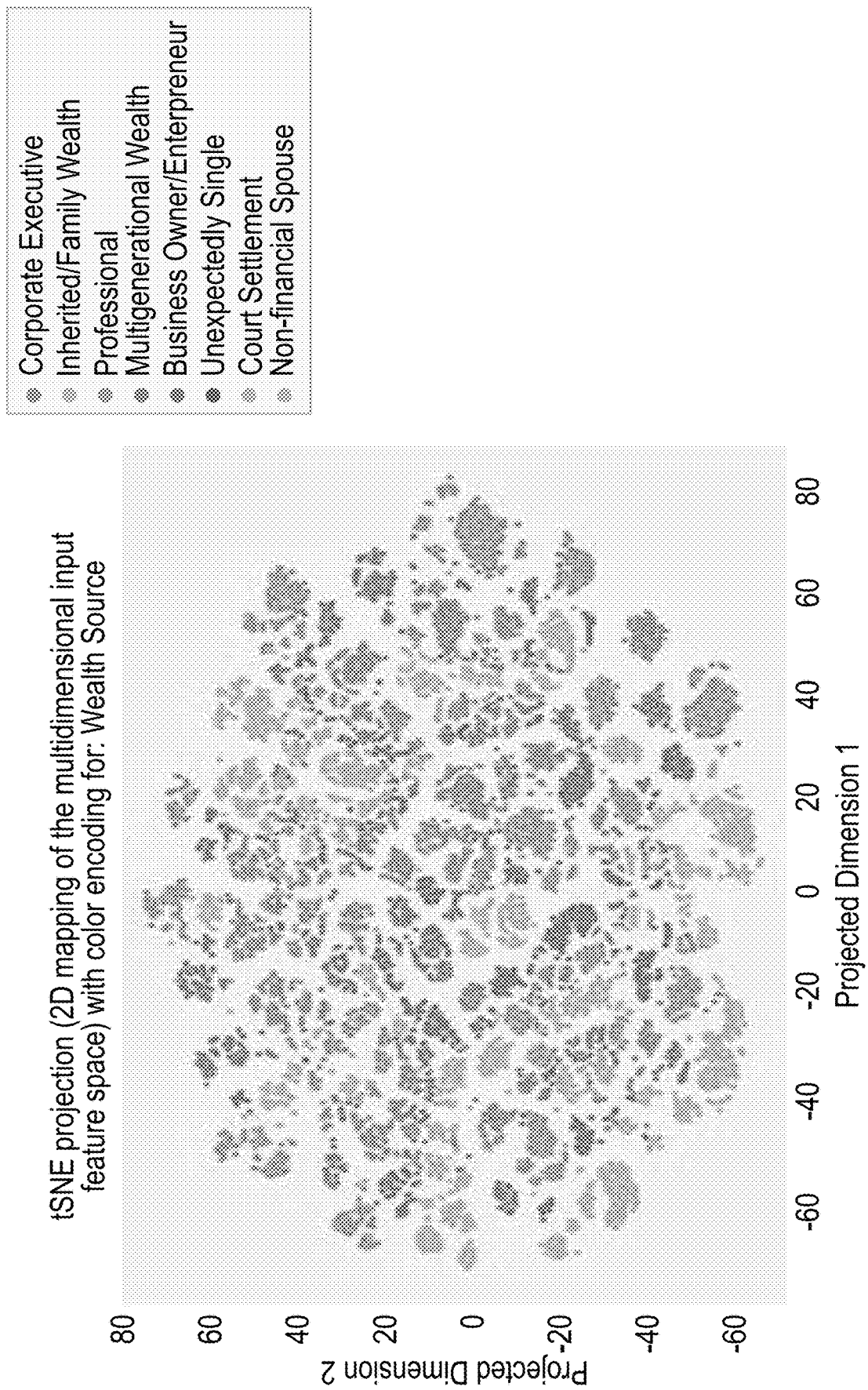
FIG. 5 shows a distribution for a set of profiles for an embodiment according to this disclosure.
Figure 9:

FIG. 5 illustrates a distribution of profiles across input attributes projected on two dimensions, as color-coded by source of wealth and each dot representing a profile. The distribution shows a) the input attributes can effectively identify subgroups of clients that share more similar profiles, as indicated by distinctive groups of dots; and b) there is no evidence of "curse of dimensionality" using the input attributes simultaneously as overall profiles almost uniformly fills the space along the two projected dimensions and there are no obvious sparse spaces among groups of clients.

As per FIG. 2, the data sources used by CLM model include various databases, as further explained below.

The WDS database functions as the core data source of the network-based CRM application program, consolidating various profile sets. The WDS is the inflow into the CRM application program is the outflow from the CRM application program. The WDS database is used for kNN model inputs and downstream benchmark generation. The model development uses one-time extracts from production data generated by SQL queries to extract PII-scrubbed files. Manually delivered to a network storage drive where the data pipelines can access them. The data extract is profiled and quality checked on data schema, data volume/row count, missing rate of relevant fields and verified by the administrative team for the computing instance 100. The implemented model will use nightly extracts generated by SQL queries and delivered automatically to network drive via FTP for processing. For validation, each time the end-to-end data pipelines runs, there is validation of the incoming source data using a validation library (e.g., Python library Great Expectations). The initial extracts that were used to train the model are profiled to generate a set of data rules, including column counts/names, expected range of rows, expected types/values in each column. All subsequent extracts may be validated against those rules.

The GPS database stores includes attributes for financial goals (family, discretionary, philanthropic, and lifestyle) and held-away asset information. The GPS data source is used for kNN model inputs and downstream benchmark generation. The model development uses one-time extracts generated by NoSQL database (e.g., MarkLogic) queries to extract and formatted into tabular data. Manually delivered to a network storage drive where the data pipelines can access them. The data extract is profiled and quality checked on data schema, data volume/row count, missing rate of relevant fields and verified by the administrative team for the computing instance 100. The implemented model will use nightly extracts generated by SQL queries and delivered automatically to network drive via FTP for processing. For validation, each time the end-to-end data pipelines runs, there is validation of the incoming source data using a validation library (e.g., Python library Great Expectations). The initial extracts that were used to train the model are profiled to generate a set of data rules, including column counts/names, expected range of rows, expected types/values in each column. All subsequent extracts may be validated against those rules.

The NPF database provides detailed positional balance information for users, including asset mix and transaction data. The NPF data source is used for downstream benchmark generation. The model development uses one-time extracts generated by SQL queries to extract PH-scrubbed files. Manually delivered to a network storage drive where the data pipelines can access them. The data extract is profiled and quality checked on data schema, data volume/row count, missing rate of relevant fields and verified by the administrative team for the computing instance 100. The implemented model will use nightly extracts generated by SQL queries and delivered automatically to network drive via FTP for processing. For validation, each time the end-to-end data pipelines runs, there is validation of the incoming source data using a validation library (e.g., Python library Great Expectations). The initial extracts that were used to train the model are profiled to generate a set of data rules, including column counts/names, expected range of rows, expected types/values in each column. All subsequent extracts may be validated against those rules.

The WDS 2.0 database is a detailed positional data for trusts, including asset mix for separately managed accounts and transaction data. This data source is used for downstream benchmark generation. The model development uses one-time extracts generated by NoSQL database queries (e.g., MarkLogic) to extract and formatted into tabular data. Manually delivered to a network storage drive where the data pipelines can access them. The data extract is profiled and quality checked on data schema, data volume/row count, missing rate of relevant fields and verified by the administrative team for the computing instance 100. The implemented model will use nightly extracts generated by SQL queries and delivered automatically to network drive via FTP for processing. For validation, each time the end-to-end data pipelines runs, there is validation of the incoming source data using a validation library (e.g., Python library Great Expectations). The initial extracts that were used to train the model are profiled to generate a set of data rules, including column counts/names, expected range of rows, expected types/values in each column. All subsequent extracts may be validated against those rules.

The ASM database is the trust servicing data source with trust attributes (e.g., trust types) in addition to the WDS database. The ASM data source is used for downstream benchmark generation. The model development uses standard reporting files extracted from another computing system. Manually delivered to a network storage drive where the data pipelines can access them. The data extract is profiled and quality checked on data schema, data volume/row count, missing rate of relevant fields and verified by the administrative team for the computing instance 100. The implemented model will use nightly extracts pulled from XACT and delivered automatically to network drive via FTP for processing. For validation, each time the end-to-end data pipelines runs, there is validation of the incoming source data using a validation library (e.g., Python library Great Expectations). The initial extracts that were used to train the model are profiled to generate a set of data rules, including column counts/names, expected range of rows, expected types/values in each column. All subsequent extracts may be validated against those rules.

The KYC database (e.g., Actimize) provides data to the CLM model, which may use Know Your Customer (KYC) data including client demographics and source of wealth information. The KYC data is used as augmentation to increase fill rate for demographics and wealth source information in the WDS database. The KYC data source is used to populate missing model input attributes either via imputation or direct usage. The model development uses extracts pulled from a reporting system in tabular format. Manually delivered to a network storage drive where the data pipelines can access them. The data extract is profiled and quality checked on data schema, data volume/row count, missing rate of relevant fields and verified by the administrative team for the computing instance 100. The implemented model will use automated extraction and delivery via FTP into the network storage drive. For validation, each time the end-to-end data pipelines runs, there is validation of the incoming source data using a validation library (e.g., Python library Great Expectations). The initial extracts that were used to train the model are profiled to generate a set of data rules (e.g., column counts/names, expected range of rows, expected types/values in columns). All subsequent extracts may be validated against those rules.

For optimal accuracy, the CLM model should have profile data available for the five input attributes used to identify similar profiles, such as source of wealth, total asset, marital status, location and age. If the profile is missing any of the above, then that profile information is not used for model building due to the fact that identifying similar profiles under missing attributes will be less accurate. To remediate this, the user (e.g., the RM or WS) can input the missing information for the target profile when using the CLM model. Upon receiving the input data, the model will score the target profile using filled information to generate output.

As explained herein, there are two major steps in the design of CLM model. The first step includes identify a group of client profiles in the modeling base that are most similar to the target client profile across all input attributes (neighbors). The second step includes determining (e.g., calculating) the quantitative benchmarks related with WM topics using historical data that are captured for the neighbors across the computing instance 100.

The CLM model uses a kNN algorithm to identify neighbors. First, the kNN algorithm calculates a numeric distance between two clients using all input attributes, where the distance is a numeric representation of dissimilarity between the two clients, i.e., larger distance value indicates less similar clients and smaller distance value indicates more similar clients. Second, the kNN algorithm select a subset of clients where their distance to the target client are smallest among all active clients (defined as nearest neighbors). The nearest neighbors correspond to the clients that are most similar with the target client based on all attributes considered. The size of nearest neighbors are identified analytically based on the distribution of pairwise distances across all active clients in the modeling base.

The first step of the CLM model is to identify a subset of existing clients that are most similar to the target client across input attributes, using kNN algorithm to search for a subset with smallest pairwise distances with the target client. The distance between every two clients in the modeling base is defined as weighted Euclidean distance between numeric and one-hot encoded categorical attributes. Each attribute is weighted in calculating distance based on the importance in characterizing similar client profiles. The importance weight is derived based on dispersion of each attribute. An attribute has higher weight if the dispersion is larger within modeling base, which indicates that the attributes captures larger variability across clients. Cross-entropy is calculated for each attribute and used as weights in the distance calculation. The input attributes and weights are used identify similar clients profiles across the modeling base. Specifically, for a given client profiles, the top k most similar clients profiles are identified using the weighted distance separation in the search space (e.g., a kNN implementation leveraging a KD-tree search space partitioning technique from a Python package scikit-learn). The optimal K is determined based on the fidelity between the client profiles and nearest neighbor profiles—for a high-K, the divergence between the client profile and neighbor profiles increases and this trend is used to determine the appropriate value of K.

The second step of the CLM model is to determine (e.g., calculate) quantitative benchmarks related with WM topics using historical data that are captured for the neighbors across the computing instance 100. A quantitative benchmark can be a numeric value that summarizes on a specific WM topic among most similar client profiles (e.g., account status or balances, asset allocation, product holding, behavioral, transactions, planning). The CLM model has implemented 54 quantitative benchmarks based on business priority and data availability, although less or more quantitative benchmarks is possible as well. The benchmarks can be organized under a parent-child structure, whereby each primary benchmark has associated child benchmarks mapped according to suitability as predetermined.

Since there are uses when the CLM model will not be a recommendation tool, in those situations, the kNN algorithm is best suitable and industry standard to identify top similar client profiles with the target client profiles. As such, for these situations, the input attributes used by the CLM model only include demographics, net worth and financial goal information, but not specific information on advice topics, products or account holding.

The CLM model uses weighted Euclidean distance as a measure of similarity of clients across input attributes. Generally, the Euclidean distance is robust and not susceptible to outliers. Although other statistical distances can be used, the Euclidian distance is technologically advantageous over other statistical distances in some use cases. For example, the Manhattan distance is not selected due to sensitivity to outliers. For example, the Minkowski distance with power higher than 2 is not required as such distance not providing any additional benefit over Euclidean distance.

The Euclidean distance used by kNN model incorporates cross-entropy weighting to account for the level of information content in each input attributes. The rationale is to allow more informative attributes (e.g., Total asset, age) to have higher importance (higher weight) than less informative attributes (e.g., is retired) to improve the similarity of neighbors. Information based weighting is best suitable for identifying similar client profiles, and cross-entropy weight is selected as optimal for information based weighting.

For the input attributes where data not captured for all client profiles, the missing information is treated as not applicable for a client (Boolean variable value set to False). For example, these variables include whether client has children, whether client has adult children, whether client has young children, whether client has discretionary, family, lifestyle and philanthropic goals, respectively. The rationale is that by setting missing information to non-applicable category allows the kNN model to identify neighbors using information from other attributes and less affected by the missing value. Using weighted distance metrics mitigates the impact of missing values as the attributes with high missing rate tends to have smaller cross-entropy weight, and hence less important in calculating distance.

The number of similar client profiles (parameter k of kNN) used to created benchmarks is 30, which is derived based on the analysis for optimal balance between the similarity of clients with neighbors (favors smaller k) and the coverage of GPS clients in the neighbors to support benchmarks that requires GPS data elements (favors larger k). However, this number is not required and more neighbor profiles (e.g., 33) or less neighbor profiles (e.g., 28) are possible.

Across the benchmarks that the CLM model can generate, a prioritization algorithm is implemented to rank benchmarks based on the relevance (how informative the benchmark is) and client deviation (how different the client value is from the benchmark value of similar clients). The assumption is that the benchmark should be prioritized if that benchmark shows high relevance (more heterogeneous values among neighbors), as well as high deviation of client values with neighbors.

Generally, the CLM model requires clients to have data available for major input attributes used to identify similar profiles (e.g., source of wealth, total asset, location, marital status, and age). If a client profile is missing any of major attributes, then the client may be out of scope of the CLM model due to the fact that identifying similar profiles with missing values in key attributes will be less accurate and hence resulted in less accurate benchmarks. There may be a data verification process to update client attributes if not captured. Upon updating the client attributes, the CLM model may recreate the benchmarks using updated client profile information.

Profiles with missing information on some attributes (e.g., having children, having young children, having adult children) may be included in the modeling base. The CLM model may use default values to identify neighbors assuming the target profile is not applicable for that attribute. The benchmarks calculated from neighbors can be slightly affected in a way that they are not reflecting the target client situation where certain information is missing (e.g., benchmarks related with children if that data is not captured for the client). There is a data verification process to update client attributes if not captured in the computing instance 100. Upon updating the target client profile attributes, the CLM model will recreate the benchmarks using updated client profile information. The kNN algorithm uses cross-entropy weights where the above attributes tend to have lower weight due to high missing rate, and hence is less influential in calculating distance used for identifying similar client profiles.

In some use cases, the CLM may not generate benchmarks that requires certain data fields if a client profile has less than 10 neighbors that are client profiles. In those use cases, a sample size larger than 10 profiles is should be used to determine credible summary statistics for a benchmark. The number of neighbors for the kNN algorithm (k value) is selected to balance the level of similarity of neighbors (which favors fewer neighbors) with the coverage of benchmarks across client profiles (which favors more neighbors where more clients get chance to be included). The selected k value of 30 allows 80% of clients with more than 10 neighbors. However, note that less than 10 neighbors (e.g., 9, 8) is possible in certain use cases.

There are use cases where the neighbors for client profiles with certain attributes tends to have higher dissimilarity compared with the rest due to that fewer clients are able to match the same class. In these use cases, the benchmarks may be created from client profiles that share similar profiles from other attributes while allowing mismatch for the smaller categories. The benchmarks will still be applicable but might not reflecting the target client profile situation regarding the small class if there are not enough clients in the same category among existing client profiles. In those situations, additional explanation may be provided to the user regarding these benchmarks in the user interface to provide guidance on usability of the benchmark for the target client profile.

The set of profiles may be sourced from one of the source databases in the source data logical unit 102. The set of profiles may be stored in a table with a unique identifier for each profile, which may be used as a primary or specific key as well as linking across other tables or source databases.

The benchmarks may be generated based on data from one of the source databases in the source data logical unit 102. Such data provides input attributes related with goals and is appended to the table with the unique identifiers and may add specific goal attributes to the CLM model input.

When some attributes in some profiles are missing, another source database in the source data logical unit 102 may be used to improve fill rate for some attributes for profiles with missing attributes. Such may improvement of the fill rate may occur by matching based on the unique identifiers.

Data sources used to create the benchmarks are appended (e.g., left joined) to master dataset of core profile base to add all necessary data fields to determine the benchmarks. These data sources may not be used to provide model inputs and may have no role in determining modeling base.

There may be three steps in constructing the master dataset for the CLM model: 1) creating dataset of modeling base, 2) feature engineering of model inputs, and 3) integrating data sources for determining benchmarks. For example, the feature engineering of model inputs may include creating numeric features for each input attribute used by the kNN algorithm. For example, integrating the data sources for determining benchmarks may include providing the raw data extract and a group of tables from the raw data extract are used. There are tens of fields that may be needed for determining benchmarks and those are included in the process and appended to the master table.

For the CLM model, data engineering process is implemented in a package for streamlining analytics projects (e.g., Kedro). For each data source, the data engineering pipeline include an ingestion pipeline to source from raw data extract, as well as a data profiling pipeline to create field-level and table-level profiling reports and summary statistics. The CLM model and kNN algorithm are implemented in Python, but other programming languages (e.g. Perl) may be used, whether additionally or alternatively. The modeling code pipeline is implemented in Kedro, but other programming frameworks (e.g., PyTorch) may be used, whether additionally or alternatively.

Weighted Euclidian distance is used to calculating the distance between a pair of profiles across features from input attributes. Assuming $x_j$ is the value of feature j on profile A and $y_j$ is the value of feature j on profile B, with feature values being pre-defined or pre-weighted, the weighted Euclidian distance ($d_{AB}$) between profiles A and B is defined as $$d_{AB} = \sqrt{\sum_{j=1}^{p} w_j(x_j - y_j)^2},$$

where p is the total number of input features after transformation or one-hot encoding.

The weights are used in distance determination to allow features to have different contribution in distance determination based on the level of information content in each feature. The metric "cross-entropy" is used as the weight to quantify the information content of each feature. For a category variable X, the cross-entropy weight for feature j is defined as $$w_j = -\frac{1}{N}\sum_{i=1}^{N}\sum_{j}^{M} x_{ij} \log Pr(x_{ij} = 1)$$

where N is the total number of profile in the profile base, M is the number of classes in variable X, $x_{ij}$ is the one-hot encoded feature value (0/1) for class j of profile i on variable X. The cross entropy weight for all encoded features from a same attribute are identical, e.g., the weight for encoded variables on each type of attribute are the same.

To calculate the cross-entropy weight for a continuous variable, first the variable is grouped into discrete bins and then same calculation for categorical variables is applied to the discretized quartiles. Applying cross-entropy weighting reduces dimensionality of input variables where the variables with higher sparsity receive smaller weight and hence contribute less to the distance determination. Using weights significantly improves the similarity between neighbors with target profile. More informative variables may have higher weight than the rest which are relatively less informative due to different level of missing values.

The kNN algorithm may use the "NearestNeighbors" method from Python package scikit-learn to identify the top k profiles that are most similar (in smallest distance) with the target profile, although other packages are possible. The CLM model uses the weighted Euclidean distance described herein as the distance metric for the "NearestNeighbors" method.

Selection of number of nearest neighbors (value of k) is based on selecting the optimal number of neighbors for the kNN algorithm. First, the metrics used to measure similarity of neighbors with targeted profiles are defined. The approach to select optimal k is then described based on the similarity metrics as evaluation criteria. The similarity score between a target client and all neighbors may be as further described below. For a numeric variable, the similarity score between targeted profile and all k neighbors is calculated as 1−Mean Absolute Percent Error of the variable between target profile and neighbors. For a categorical variable, the similarity score between targeted profile and k neighbors is calculated as % Match Rate of the variable between target profile and neighbors. The match rate is calculated as the % of profiles among the neighbors where they have the same class of the categorical variable. Higher score means better match between target profile and neighbors.

There are two considerations when determining the optimal number of neighbors for kNN algorithm: a) the number of neighbors should be sufficient to provide statistical credibility and good coverage of GPS clients given that GPS clients are only a small subset; b) the number of neighbors should be limited to avoid including unnecessary number of profiles that are less similar to the target profiles. The following steps may be used to determine a range of k based on the criteria.

Initially, for each predefined k=1-100: Compute similarity score for each profile in a subset of profiles from the modeling base. Calculate median of similarity score among all profiles due to the asymmetric distribution of scores. Plot median similarity score against k. As the value of k increases, the similarity score decreases due to that profiles that are less similar with the target profiles get included in the nearest neighbors. Determine an optimal range of k value where the rate of decrease in similarity score reaches steady state—with increasing number of k, the rate that the median similarity score decreases stabilizes or slows down, which means profiles get included beyond k are equally dissimilar with the k-th profile and don't show similarity to be included in the neighbors. A range of 20-40 is identified from the decreasing of similarity score for numeric and categorical variables (FIG. 6). At k=40, numerical score is ~0.65, indicating that on average there's 33% deviation from profiles' numerical attributes with neighbors. Further increasing k beyond 40 has diminishing returns in including more profiles to nearest neighbors as the similarity score drops at a steady rate, indicating that they are equally as dissimilar with the target profile as the k-th client and not needed to be included, although possible. Note that FIG. 7 illustrates the decrease of median similarity score (KNN comparison score) of numeric (left) and categorical (right) variables between client and neighbors The second decision criteria is to identify a k value within the selected range (20-40 from step a)) such that there are enough profiles where the neighbors have data available (>10). Among the subset of profiles from the modeling base, the number of profiles with less than 10 neighbors are calculated for k=20, 25, 30, 35, and 40.

Coverage of profiles within neighbors increases with the number of neighbors. The k value below 25 poses risk of more than 15% of clients without benchmarks available. The k value of 30 is selected for balancing between similarity of neighbors with profile coverage. However, note that this value is illustrative and other k values may be used (e.g., 28, 33). Note that this elbow-point analysis was conducted on a sample set of clients—this sample is a subset of the current modeling base and other ensuing changes to the feature weights and the model are within reasonable bounds for the 20-40 optimal range for k to be valid. Specifically, there may be one feature out of others (e.g., 12) which may see a change in the entropy weight (from −0.6 to −1). Secondly, the similarity scores show the same values in both sets (median weighted numerical dissimilarity score: 20%, median weighted categorical dissimilarity score: 2%), where the sets differ in profile size, attributes included, and attribute weights.

The CLM model may enable generation of the benchmarks which are then prioritized. For example, in context of wealth management, the CLM model may generate 52 (or another number) benchmarks for each user profile. These benchmarks are grouped together into parent and child benchmarks based on topics of discussion by RMs or WSs. For example, a Line of Credit discussion may also involves deposit accounts, number of lines of credit, debt to asset ratio, illiquidity, and other factors. The benchmarks for each user profile may be prioritized based on a rank ordering approach to allow users (e.g., RMs or WSs) to see more relevant benchmarks for the target profile at the beginning of the list. The rank approach for the benchmarks may be based on some of the following criteria. First, the ranking approach should distinguish between a Boolean (Yes/No) benchmark and continuous (for example, debt to asset ratio) benchmark. Second, the ranking approach should account for variability within neighbors. The ranking should rate benchmarks lower if the benchmarks have homogeneous distributions. A benchmark with more heterogeneous distribution among neighbors indicates that there have been more diverse options available for the profiles and worth more consideration compared with those less diverse. Third, the ranking approach should capture deviation between the target profile and its neighbors. A sufficient prioritization scheme will elevate those benchmarks which exhibit a notable deviation between the target profile's value and the neighbors' values. For example, if the target profile is currently not using line of credit (one attribute) and showing interest in using one (another attribute), and the benchmark shows 80% of similar user profiles are using lines of credit, this is a case worth considering and hence should be prioritized higher among all the benchmarks. As such, the approach for prioritization may be designed as follows. For a given Parent Boolean (Yes/No) benchmark output of a target profile, compute the score as percentage points of Yes neighbors. For a given Parent Continuous benchmark, compute the score as difference between target and neighbor average, followed by normalization with range of neighbor values. Normalization ensures that score remains between 0 and 100 and hence can be compared with Boolean benchmark scores. Prior to ranking on the aforementioned metric, some, many, most, or all benchmarks scores are first boosted by 100 on a threshold flag (0 or 1) based on flag being 0 if the benchmark is a benchmark of a certain type and the target has less than 10 benchmarks of that type (this is to ensure analytically robust benchmark values); otherwise flag is 1. Note that although this is discussed in context of wealth management, this technology is not limited to such field. Rather, the this technology can be applied to other fields, whether in advisory services, e-commerce, or other suitable fields.

The CLM model can output content and report content. For each target profile, the CLM model generates neighbors which are used to compute the quantitative benchmarks from the corresponding variables from the master dataset. Each benchmark is calculated as summary statistics across all neighbors that are identified by the kNN algorithm. For each target profile in the modeling base, the benchmarks are displayed to the RMs or WSs when the RMs or WSs open a page or screen from a client profile page or screen in the network-based CRM application program or a goal planning application program. Each of the parent benchmark is mapped to one or more "Advisory Moments". Each of the Advisory Moments is a visual categorization (e.g., a screen, a pane, a tile) of the most common WM topics that helps to guide RMs or WSs to select a subset of more relevant benchmarks with a upcoming conversation. The child benchmarks are mapped to the parent benchmarks and are shown on a click-through page or screen.

As shown in FIG. 11, the benchmarks for each client will be displayed in the network-based CRM application program under a client profile page. For example, there may be a tab for CLM outputs to display benchmarks. The benchmarks may be displayed by default in the order of prioritization rank based on the approach described herein. The user also has option to view a subset of benchmarks based on the Advisory Moments by selecting from a list (e.g., a selection panel on a left side). FIG. 12 illustrates a screen of the user interface with click-through page activated after clicking on "See More Details" in FIG. 11.

Figure 14:
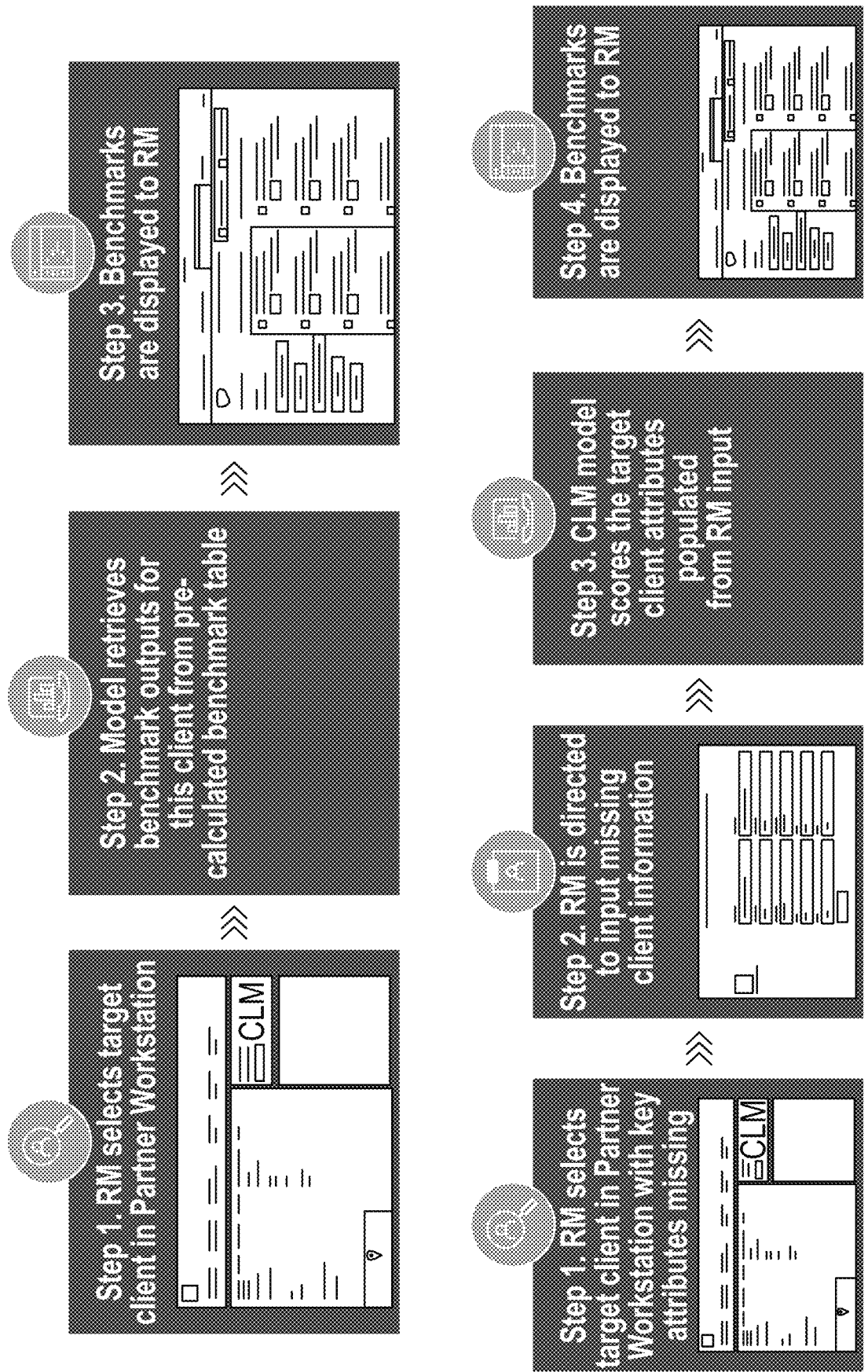
FIG. 14 illustrates a pair of embodiments of a pair of workflows according to this disclosure.
Figure 15:
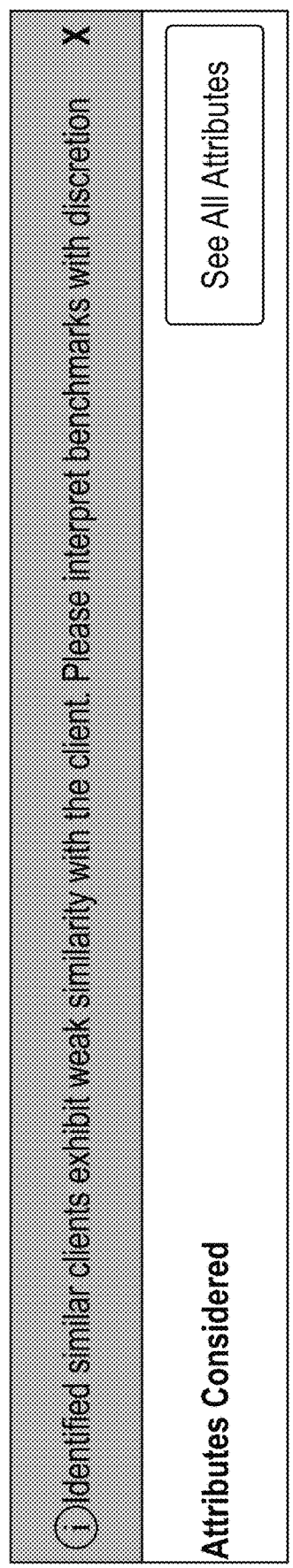
FIG. 15 illustrates an embodiment of a warning message according to this disclosure.

As explained herein, the network-based CRM application program may be programmed to allow for several workflow paths to display the benchmarks to the user. For a profile without missing attributes needed for the kNN algorithm to identify nearest statistical neighbors, the benchmarks are displayed on the user interface after the user evokes the CLM functionality in the network-based CRM application program or a goal planning program. For a profile with missing attributes needed for the kNN algorithm to identify nearest statistical neighbors, the user is directed to a screen in the network-based CRM application program to enter missing information. The CLM model will then score the profile and display the benchmarks for that profile. FIG. 13 illustrates the user interface for missing data entry and the flow of the workflow paths are illustrated in FIGS. 14 and 15. In some situations, the user interface may be programmed to present a warning message should the similarity between the profile and neighbors exceed a percentile threshold (e.g., $95^{th}$ percentile) for of the numerical or categorical scores as shown in FIG. 16; this conveys the relevant discretionary information to users to facilitate a meaningful response. For example, the warning message may be due to low similarity between target profile and its statistical neighbors.

The CLM model may be scored daily (or other time periods) in batch to recalculate benchmark for profiles in the modeling base. The daily refresh is using the same modeling base and recalculate the benchmark values by ingesting data sources from raw systems. The CLM model may be retrained at least monthly (or other time periods) to reconstruct the modeling base using latest updated data extract from source systems. Model re-training requires rebuilding the kNN model using updated modeling base and retune parameters including cross-entropy weights for input attributes and the number of nearest neighbors. The retrained model should be validated against previous versions for the dissimilarity scores to ensure consistent performance. The monitoring is designed for quality control for model input data sources and modeling base construction and quality checks of weighted dissimilarity scores of nearest neighbors across modeling base. The quality control of model input data sources includes qualitative checks of existence of required tables and data fields, and consistency of data types with first version of data extract, as well as quantitative checks of data volume, missing rate, distributional drift of input attributes. Model performance monitoring focuses on capturing deviations of weighted dissimilarity scores from the existing version of the CLM model. Monitoring model performance using dissimilarity score should be performed each time the model is retrained.

This disclosure is applicable and correspondingly adaptable to various advisory services. For example, these fields include finance, accounting, wealth management, medicine, personalized healthcare, or other advisory fields of use.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although various embodiments have been depicted and described in detail herein, skilled artisans know that various modifications, additions, substitutions and the like can be made without departing from this disclosure. As such, these modifications, additions, substitutions and the like are considered to be within this disclosure.

What is claimed is:

1. A system, comprising:
   a computing instance including a server, a database, and a network storage, wherein the server includes a processor and a memory, wherein the database and the network storage is coupled to the server, wherein the processor is programmed to:
      access a set of profiles, wherein each profile in the set of profiles contains a profile identifier and a set of attributes, wherein each set of attributes in the sets of attributes includes a numerical attribute, a categorical attribute, and a Boolean attribute;
      identify a subset of profiles from the set of profiles for each respective profile in the set of profiles via a k-Nearest Neighbor (kNN) algorithm based on that subset of profiles being most similar to that respective profile according to a set of statistical distances measured and weighted using a statistical measure of entropy across the sets of attributes for the set of profiles based on the numerical attributes, the categorical attributes, and the Boolean attributes, wherein the kNN algorithm involves a kNN model that is unsupervised;
      associate the subsets of profiles respectively with the set of profile identifiers;
      present a user interface after the subsets of profiles are associated respectively with the set of profile identifiers, wherein the user interface is programmed to receive a user selection of a profile from the set of profiles;
      receive the user selection from the user interface; and
      in response to the user selection being received:
         identify a profile identifier for the profile based on the user selection;
         identify a subset of profiles associated with the profile identifier;
         access a set of quantitative benchmarks related with a set of content using the sets of attributes for the subset of profiles where each quantitative benchmark in the set of quantitative benchmarks is (i) a numeric value that summarizes on a specific content in the set of content among the subset of profiles and (ii) organized in a parent-child structure with each parent benchmark having associated child benchmarks mapped according to suitability for the profile;
         rank the set of quantitative benchmarks based on a degree of quantitative benchmark relevance among the subset of profiles associated with the profile identifier and a degree of profile deviation, wherein the degree of quantitative benchmark relevance measures how informative that respective quantitative benchmark is relative to other respective quantitative benchmarks for the profile, wherein the degree of profile deviation measures how different that respective quantitative benchmark is for the profile relative to those same respective quantitative benchmarks for the subset of profiles; and
         present the set of quantitative benchmarks as ranked and organized in the parent-child structure in the user interface, wherein the computing instance includes an analytics environment and an API environment, wherein the analytics environment and the API environment are separate and distinct from each other, wherein the analytics environment includes a data engineering pipeline and an intermediate database, wherein the API environment includes an API server and a client logic, wherein the API server is in communication with the intermediate database and the client logic, wherein the data engineering pipeline identifies the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes and associates the subsets of profiles respectively with the set of profile identifiers in the intermediate database, wherein the API server presents the user interface on the client logic, accesses the set of quantitative benchmarks, and ranks the set of quantitative benchmarks.

2. The system of claim 1, wherein the client logic runs on a network-based customer relationship management application program.

3. The system of claim 1, wherein the data engineering pipeline accesses the set of profiles based on interfacing with a set of source databases external to the analytics environment and the API environment.

4. The system of claim 1, wherein the analytics environment includes the network storage storing the set of profiles, wherein the data engineering pipeline is in communication with the network storage to identify the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes.

5. The system of claim 1, wherein the computing instance is programmed to:
   present the user interface when the user selection of the profile corresponds to the profile that is missing a respective numerical attribute, a categorical attribute, or a Boolean attribute required for identifying the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes, wherein the user interface is programmed to receive a user input for the respective numerical attribute, the categorical attribute, or the Boolean attribute that is missing from the profile;
   receive the user input from the user interface;
   identify the subset of profiles from the set of profiles for the profile based on the user input and that subset of profiles being most similar to that respective profile according to the set of statistical distances measured and weighted using the statistical measure of entropy across the sets of attributes for the set of profiles based on the numerical attributes, the categorical attributes, and the Boolean attributes;
   access the set of quantitative benchmarks related with the set of content using the sets of attributes for the subset of profiles where each quantitative benchmark in the set of quantitative benchmarks is (i) the numeric value that summarizes on the specific content in the set of content among the subset of profiles and (ii) organized in the parent-child structure with each parent benchmark having associated child benchmarks mapped according to suitability for the profile;
   rank the set of quantitative benchmarks based on the degree of quantitative benchmark relevance and the degree of profile deviation;
   present the set of quantitative benchmarks as ranked and organized in the parent-child structure in the user interface.

6. The system of claim 5, wherein the user interface is a tabbed interface having a tab to enter the user input for the respective numerical attribute, the categorical attribute, or the Boolean attribute that is missing from the profile, wherein the set of quantitative benchmarks is presented not in the tab.

7. The system of claim 1, wherein the computing instance identifies the subset of profiles from the set of profiles for the profile based on personally identified information being removed from the set of profiles or to generate the set of profiles.

8. The system of claim 1, wherein the subsets of profiles are identified based on similarity measured across a group of attributes, wherein the set of quotative benchmarks is numerically greater than the group of attributes.

9. The system of claim 1, wherein the user interface presents a set of tiles corresponding to the set of quantitative benchmarks, wherein each tile in the set of tiles is expandable to present or leads to a screen presenting a set of detailed information for that respective quantitative benchmark.

10. A method, comprising:
    accessing, by a computing instance, a set of profiles, wherein each profile in the set of profiles contains a profile identifier and a set of attributes, wherein each set of attributes in the sets of attributes includes a numerical attribute, a categorical attribute, and a Boolean attribute, wherein the computing instance including a server, a database, and a network storage, wherein the server includes a processor and a memory, wherein the database and the network storage is coupled to the server;
    identifying, by the computing instance, a subset of profiles from the set of profiles for each respective profile in the set of profiles via a k-Nearest Neighbor (kNN) algorithm based on that subset of profiles being most similar to that respective profile according to a set of statistical distances measured and weighted using a statistical measure of entropy across the sets of attributes for the set of profiles based on the numerical attributes, the categorical attributes, and the Boolean attributes, wherein the kNN algorithm involves a kNN model that is unsupervised;
    associating, by the computing instance, the subsets of profiles respectively with the set of profile identifiers;
    presenting, by the computing instance, a user interface after the subsets of profiles are associated respectively with the set of profile identifiers, wherein the user interface is programmed to receive a user selection of a profile from the set of profiles;
    receiving, by the computing instance, the user selection from the user interface; and
    in response to the user selection being received by the computing instance:
        identifying, by the computing instance, a profile identifier for the profile based on the user selection;
        identifying, by the computing instance, a subset of profiles associated with the profile identifier;
        accessing, by the computing instance, a set of quantitative benchmarks related with a set of content using the sets of attributes for the subset of profiles where each quantitative benchmark in the set of quantitative benchmarks is (i) a numeric value that summarizes on a specific content in the set of content among the subset of profiles and (ii) organized in a parent-child structure with each parent benchmark having associated child benchmarks mapped according to suitability for the profile;
        ranking, by the computing instance, the set of quantitative benchmarks based on a degree of quantitative benchmark relevance among the subset of profiles associated with the profile identifier and a degree of profile deviation, wherein the degree of quantitative benchmark relevance measures how informative that respective quantitative benchmark is relative to other respective quantitative benchmarks for the profile, wherein the degree of profile deviation measures how different that respective quantitative benchmark is for the profile relative to those same respective quantitative benchmarks for the subset of profiles; and
        presenting, by the computing instance, the set of quantitative benchmarks as ranked and organized in the parent-child structure in the user interface, wherein the computing instance includes an analytics environment and an API environment, wherein the analytics environment and the API environment are separate and distinct from each other, wherein the analytics environment includes a data engineering pipeline and an intermediate database, wherein the API environment includes an API server and a client logic, wherein the API server is in communication with the intermediate database and the client logic, wherein the data engineering pipeline identifies the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes and associates the subsets of profiles respectively with the set of profile identifiers in the intermediate database, wherein the API server presents the user interface on the client logic, accesses the set of quantitative benchmarks, and ranks the set of quantitative benchmarks.

11. The method of claim 10, wherein the client logic runs on a network-based customer relationship management application program.

12. The method of claim 10, wherein the data engineering pipeline accesses the set of profiles based on interfacing with a set of source databases external to the analytics environment and the API environment.

13. The method of claim 10, wherein the analytics environment includes the network storage storing the set of profiles, wherein the data engineering pipeline is in communication with the network storage to identify the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes.

14. The method of claim 10, further comprising:
presenting, by the computing instance, the user interface when the user selection of the profile corresponds to the profile that is missing a respective numerical attribute, a categorical attribute, or a Boolean attribute required for identifying the subset of profiles from the set of profiles for each respective profile in the set of profiles based on that subset of profiles being most similar to that respective profile according to the set of statistical distances measured and weighted using the statistical measure of entropy across the sets of attributes for the set of profiles based on the numerical attributes, the categorical attributes, and the Boolean attributes, wherein the user interface is programmed to receive a user input for the respective numerical attribute, the categorical attribute, or the Boolean attribute that is missing from the profile;
receiving, by the computing instance, the user input from the user interface;
identifying, by the computing instance, the subset of profiles from the set of profiles for the profile based on the user input and that subset of profiles being most similar to that respective profile according to the set of statistical distances measured and weighted using the statistical measure of entropy across the sets of attributes for the set of profiles based on the numerical attributes, the categorical attributes, and the Boolean attributes;
accessing, by the computing instance, the set of quantitative benchmarks related with the set of content using the sets of attributes for the subset of profiles where each quantitative benchmark in the set of quantitative benchmarks is (i) the numeric value that summarizes on the specific content in the set of content among the subset of profiles and (ii) organized in the parent-child structure with each parent benchmark having associated child benchmarks mapped according to suitability for the profile;
ranking, by the computing instance, the set of quantitative benchmarks based on the degree of quantitative benchmark relevance and the degree of profile deviation;
presenting, by the computing instance, the set of quantitative benchmarks as ranked and organized in the parent-child structure in the user interface.

15. The method of claim 14, wherein the user interface is a tabbed interface having a tab to enter the user input for the respective numerical attribute, the categorical attribute, or the Boolean attribute that is missing from the profile, wherein the set of quantitative benchmarks is presented not in the tab.

16. The method of claim 10, wherein the computing instance identifies the subset of profiles from the set of profiles for the profile based on personally identified information being removed from the set of profiles or to generate the set of profiles.

17. The method of claim 10, wherein the subsets of profiles are identified based on similarity measured across a group of attributes, wherein the set of quotative benchmarks is numerically greater than the group of attributes.

18. The method of claim 10, wherein the user interface presents a set of tiles corresponding to the set of quantitative benchmarks, wherein each tile in the set of tiles is expandable to present or leads to a screen presenting a set of detailed information for that respective quantitative benchmark.

* * * * *